US012583271B2

(12) United States Patent
Goutier

(10) Patent No.: US 12,583,271 B2
(45) Date of Patent: Mar. 24, 2026

(54) PNEUMATIC PRESSURE CONTROLLER

(71) Applicant: Ettienne Antonius Goutier, Cape Town (ZA)

(72) Inventor: Ettienne Antonius Goutier, Cape Town (ZA)

( * ) Notice: Subject to any disclaimer, the term of this patent is extended or adjusted under 35 U.S.C. 154(b) by 571 days.

(21) Appl. No.: 18/000,247

(22) PCT Filed: Jun. 3, 2021

(86) PCT No.: PCT/IB2021/054852
§ 371 (c)(1),
(2) Date: Nov. 29, 2022

(87) PCT Pub. No.: WO2021/245583
PCT Pub. Date: Dec. 9, 2021

(65) Prior Publication Data
US 2023/0202248 A1 Jun. 29, 2023

(30) Foreign Application Priority Data

Jun. 4, 2020 (ZA) ................................. 2020/03337
Nov. 25, 2020 (ZA) ................................. 2020/07332

(51) Int. Cl.
*B60C 29/06* (2006.01)
*B60C 23/00* (2006.01)
*G05D 16/16* (2006.01)

(52) U.S. Cl.
CPC ...... *B60C 29/068* (2013.01); *B60C 23/00318* (2020.05); *B60C 23/00354* (2020.05); *G05D 16/163* (2013.01); *Y10T 137/261* (2015.04)

(58) Field of Classification Search
CPC ......... B60C 23/00354; Y10T 137/3631; Y10T 137/261
See application file for complete search history.

(56) References Cited

U.S. PATENT DOCUMENTS 2,761,464 A * 9/1956 Faust ................... G05D 16/163
137/116.5
2,965,121 A * 12/1960 Howlett ................ F16K 17/087
137/505.11

(Continued)

FOREIGN PATENT DOCUMENTS

WO WO 2017123706 A1 7/2017

OTHER PUBLICATIONS

PCT Search Report and Written Opinion Corresponding to PCT/IB2021/054852, dated Sep. 14, 2021.

*Primary Examiner* — Robert K Arundale
(74) *Attorney, Agent, or Firm* — Patterson Thuente, P.A.

(57) ABSTRACT

A pneumatic pressure controller includes a body, an inflation plunger, a vent and a deflation diaphragm or piston. The body defines an input chamber and an output chamber for connection of a pneumatic pressure source and pneumatic container respectively. The plunger is biased towards a closed condition wherein it inhibits fluid flow from the input chamber to the output chamber and is movable against the bias to allow such fluid flow for inflation of the pneumatic container. The diaphragm or piston is variably biased towards a closed condition wherein it closes the vent. The diaphragm or piston is configured to move away from the vent to an open condition under the influence of fluid pressure in the output chamber when the inflation plunger is in the closed condition and the variable bias is sufficiently reduced, enabling fluid from the pneumatic container to egress to the atmosphere via the vent.

16 Claims, 12 Drawing Sheets

(56)                    References Cited

U.S. PATENT DOCUMENTS

| | | | |
|---|---|---|---|
| 3,181,560 A | * | 5/1965 | Worden ................ F16K 17/168 |
| | | | 251/282 |
| 3,357,443 A | * | 12/1967 | Brumm ................ G05D 16/163 |
| | | | 137/489.5 |
| 3,493,007 A | * | 2/1970 | Iizumi .................. F16K 31/365 |
| | | | 137/489.5 |
| 4,250,913 A | * | 2/1981 | Scull .................... F16K 31/385 |
| | | | 137/116.5 |

* cited by examiner

48A

148A

PNEUMATIC PRESSURE CONTROLLER

CROSS-REFERENCE TO RELATED APPLICATIONS

The present application is a US National Stage of PCT Application No. PCT/IB2021/054852, filed Jun. 3, 2021, which claims the benefit of South Africa Provisional Application Nos. 2020/03337, filed Jun. 4, 2020 and 2020/07332, filed Nov. 25, 2020, which applications are incorporated herein by reference.

FIELD OF THE INVENTION

This invention relates to pneumatic pressure control. More particularly, this invention relates to a pneumatic pressure controller for controlling the pressure of a pneumatic container such as a tire.

BACKGROUND TO THE INVENTION

Pneumatic inflation and deflation are often required in the tire industry and in other fields of engineering where containers or vessels are subjected to pneumatic or air pressure. Pressure regulators are known, and generally comprise a valve that reduces the input pressure of a fluid to a desired value at its output.

Known inflation devices are seldom utilized for rapid inflation of tires, and generally they do not provide rapid deflation. Certain pressure control devices allow for relatively fast inflation of tires, but deflation may be slow. Many pressure control devices comprise electronics for sensing and/or controlling pressure electronically. These electronics may become faulty, especially if the control device is provided in a harsh environment where it is exposed to the elements or where shock, vibrations, moisture, etc., are present. Electronic pressure control devices may also be expensive and unsuitable for at least some applications.

Rapid deflation of tires is often required in agricultural, mining and off-road vehicle environments, to name but a few. In particular, driving in sandy, snowy or muddy environments may require the vehicle's tires to be deflated. Some vehicles have built-in electronic tire pressure controllers which open or close valves to inflate or deflate tires using an on-board compressor. Often, these electronic pressure controlling systems require electronic sensors to sense the current pressure of the relevant tire in order to inflate or deflate the tire to the required pressure. The valves of these systems are sometimes provided on a hub of a wheel of the tire and a complex arrangement of components provides air communication between the on-board compressor and the tire. For example, some systems enable air to pass through a passage provided along an axle of the vehicle. These electronic tire pressure controllers are complex, comprise many separate components, passages and seals, thereby increasing the possible points of failure of these systems. These electronic pressure controllers may therefore not be suitable in many applications, or may simply be too expensive.

Accordingly there is scope to address the aforementioned disadvantages and problems, or at least to provide a useful alternative to the known devices, systems and methods.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

Broadly, according to a first aspect of the invention, there is provided a pneumatic pressure controller comprising:

a body defining an input chamber in fluid flow communication with a first port, and an output chamber in fluid flow communication with a second port, wherein the first port is connectable to a pneumatic pressure source and the second port is connectable to a pneumatic container;

an inflation plunger which is biased towards a closed condition wherein it inhibits fluid flow from the input chamber to the output chamber, and which is moveable against its bias to an open condition wherein it allows fluid flow from the input chamber to the output chamber, thereby permitting inflation, through the second port, of the pneumatic container connected to the pneumatic pressure controller, in use;

a vent operatively permitting deflation of the pneumatic container; and a deflation diaphragm or a deflation piston which is variably biased towards a closed condition wherein it closes the vent, the deflation diaphragm or piston being configured to move away from the vent to an open condition under the influence of fluid pressure in the output diaphragm or piston is sufficiently reduced, enabling fluid to travel from the second port through the output chamber and through the vent into an external atmosphere.

More specifically, according to the first aspect of the invention, there is provided a pneumatic pressure controller comprising:

a body defining an input chamber in fluid flow communication with a first port, and an output chamber in fluid flow communication with a second port, wherein the first port is connectable to a pneumatic pressure source and the second port is connectable to a pneumatic container, the body further defining an inflation chamber;

an inflation plunger which is biased towards a closed condition wherein it inhibits fluid flow from the input chamber to the inflation chamber and to the output chamber, and which is moveable against its bias to an open condition wherein it allows fluid flow from the input chamber to the inflation chamber and to the output chamber, thereby permitting controlled inflation, through the second port, of the pneumatic container connected to the pneumatic pressure controller, in use; movement of the inflation plunger being controlled by movement of a regulator diaphragm connected to the inflation plunger, the regulator diaphragm being located adjacent to the inflation chamber and in turn being controlled by a combination of pressure from an adjustable biasing member and pressure in the inflation chamber, wherein the inflation plunger moves from its open condition back to its closed condition, in use, once the combined pressure from the biasing member and the inflation chamber is equal to or smaller than the bias on the inflation plunger;

a vent operatively permitting deflation of the pneumatic container, the vent having a diameter which is substantially equal to or greater than a diameter of the second port; and a deflation diaphragm or a deflation piston which is variably biased towards a closed condition wherein it closes the vent, the deflation diaphragm or piston being configured to move away from the vent to an open condition under the influence of fluid pressure in the output chamber when the inflation plunger is in the closed condition and the variable bias on the deflation diaphragm or piston is less than the fluid pressure in the output chamber, enabling fluid to travel from the second port through the output chamber and through the vent into an external atmosphere, wherein the deflation diaphragm moves from its open condition back to its closed condition, in use, once fluid pressure in the output chamber is reduced such that it is less than the variable bias on the deflation diaphragm or piston.

The inflation chamber referred to above may be a "second inflation chamber", with the body further having a "first inflation chamber" as described below.

In preferred embodiments the deflation diaphragm may be included.

The controller may include a diaphragm biasing chamber adjacent to the diaphragm which is configured to be pressurised and de-pressurised to adjust the variable bias on the deflation diaphragm.

The plunger may be connected to the regulator diaphragm (also referred to as an inflation diaphragm), which is variably biased. The plunger and regulator diaphragm may both form part of an inflation regulator together with the adjustable biasing member. The biasing member may be an adjustable spring or coil.

Further features provide for the controller to include at least a first part and a second part which are secured to one another so as to form the body of the controller; and for the inflation plunger to be slidably mounted to/in the second part of the body; and the deflation diaphragm to be mounted between the first and the second parts of the body.

Further features provide for the body to have a major axis; for the diaphragms and/or the inflation plunger to be moveable along the major axis of the body; and for the vent to extend along the major axis of the body.

For inflation in use, a required or set pressure may be adjusted by adjusting the inflation regulator so that tension in the spring and force exerted onto the regulator diaphragm is at a predetermined or selected level and flow of fluid from the input chamber to the output chamber is stopped or prevented once the required or set pressure is reached in the output chamber.

The inflation chamber referred to above may be a second inflation chamber, and the body may further define a first inflation chamber adjacent to the input chamber, the inflation plunger inhibiting fluid flow from the first inflation chamber to the second inflation chamber in its closed condition, and thus also from the input chamber to the second inflation chamber and the output chamber, and allowing fluid flow from the first inflation chamber to the second inflation chamber in its open condition. Further features thus provide for the controller to include a first inflation chamber adjacent to the input chamber; for the controller to include a second inflation chamber adjacent the regulator diaphragm; for the inflation plunger to be biased to the closed condition wherein it inhibits fluid or air flow from the first inflation chamber to the second inflation chamber (i.e. it inhibits flow to the second inflation chamber in its closed condition/ position) and moveable to an open condition wherein it enables fluid flow from the first inflation chamber to the second inflation chamber (i.e. it allows flow to the second inflation chamber in its open condition); for the regulator diaphragm to be variably biased towards the second inflation chamber to apply pressure thereon, and to engage the inflation plunger to open or close it; and for the second inflation chamber to be in fluid flow communication with the deflation diaphragm biasing chamber.

Further features provide for the variable bias on the deflation diaphragm to be provided by pneumatic pressure applied to it by the inflation regulator utilizing pressure from the first/input port; for a first supply passage to be provided between the inflation regulator and the biasing chamber; for a second supply passage to be provided between the output chamber and the inflation regulator; for a unidirectional or one-way valve to be provided to enable unidirectional or one-way fluid flow from the second inflation chamber to the output chamber through the second supply passage.

Still further features provide for the inflation regulator to be configured to regulate pressure in the deflation diaphragm biasing chamber by adjustment of the variable bias on the regulator diaphragm, such that an increase in the variable bias on the regulator diaphragm causes the inflation plunger to move to its open condition/position enabling fluid or air from the input chamber to enter the second inflation chamber through the first inflation chamber and to be conveyed to the deflation diaphragm biasing chamber, thereby applying a force on the deflation diaphragm as result of the adjustment of the variable bias on the regulator diaphragm and as result of pressure in the deflation diaphragm biasing chamber.

Further features provide for a gauge port to be provided for connecting a pressure gauge to the second inflation chamber, alternatively for the gauge port to be provided for connecting a pressure gauge to the output chamber.

Still further features provide for the pneumatic container to be a tire or other vessel to be inflated or deflated; and for the pneumatic pressure source to be a pump or a compressor for inflating the pneumatic container utilizing the controller.

Broadly, according to a second aspect of the invention, there is provided a method of controlling pneumatic pressure, the method comprising:

providing a body defining an input chamber in fluid flow communication with a first port, and an output chamber in fluid flow communication with a second port;

biasing an inflation plunger towards a closed condition wherein it inhibits fluid flow from the input chamber to the output chamber;

connecting a pneumatic pressure source to the first port;

connecting a pneumatic container to the second port;

moving the inflation plunger against its bias to an open condition wherein it allows fluid flow from the input chamber to the output chamber, thereby permitting inflation, through the second port, of the pneumatic container; and causing a variably biased deflation diaphragm or deflation piston located in the body to move away from a closed condition in which it closes a vent of the body to an open condition under the influence of fluid pressure in the output chamber when the inflation plunger is in the closed condition and the variable bias on the deflation diaphragm or piston is sufficiently reduced, thereby enabling deflation of the pneumatic container through fluid travelling from the second port through the output chamber and through the vent into an external atmosphere.

More specifically, according to the second aspect of the invention, there is provided a method of controlling pneumatic pressure, the method comprising:

providing a body defining an input chamber in fluid flow communication with a first port, and an output chamber in fluid flow communication with a second port, the body further defining an inflation chamber;

biasing an inflation plunger towards a closed condition wherein it inhibits fluid flow from the input chamber to the inflation chamber and the output chamber;

connecting a pneumatic pressure source to the first port; connecting a pneumatic container to the second port;

applying a counter-bias to move the inflation plunger against its bias to an open condition, wherein in the open condition the inflation plunger allows fluid flow from the input chamber to the inflation chamber and the output chamber, thereby permitting controlled inflation, through the second port, of the pneumatic container, movement of the inflation plunger being controlled by movement of a regulator diaphragm connected to the inflation plunger, the regulator diaphragm being located adjacent to the inflation chamber and in turn being controlled by a combination of pressure from an adjustable biasing member and pressure in the inflation chamber, wherein the inflation plunger moves from its open condition back to its closed condition once the combined pressure from the biasing member and the inflation chamber is equal to or smaller than the bias on the inflation plunger; and causing a variably biased deflation diaphragm or deflation piston located in the body to move away from a closed condition in which it closes a vent of the body to an open condition under the influence of fluid pressure in the output chamber when the inflation plunger is in the closed condition and the variable bias on the deflation diaphragm or piston is less than the fluid pressure in the output chamber, thereby enabling deflation of the pneumatic container through fluid travelling from the second port through the output chamber and through the vent into an external atmosphere, the vent having a diameter which is substantially equal to or greater than a diameter of the second port, and wherein the deflation diaphragm moves from its open condition back to its closed condition once pressure in the output chamber is reduced such that it is less than the variable bias on the deflation diaphragm or piston.

The method may include varying an amount of fluid travelling through the vent by adjusting the variable bias on the deflation diaphragm or piston.

The term "external atmosphere" means the atmosphere outside of the controller, the pneumatic pressure source and the pneumatic container.

In accordance with a third aspect of the invention, there is provided a tire inflation and deflation kit which includes a controller substantially as described above in an assembled or a disassembled condition.

Embodiments of the invention will now be described, by way of example only, with reference to the accompanying drawings.

BRIEF DESCRIPTION OF THE DRAWINGS

In the drawings:

FIG. 5 is a sectional view similar to the view of FIG. 3, showing internal components of a substantially similar controller to the controller of the first embodiment, but with a piston component thereof replaced with a diaphragm component, wherein FIG. 5 is included to illustrate an alternative configuration;

FIG. 9 is a sectional view similar to the view of FIG. 8, showing internal components of a substantially similar controller to the controller of the first embodiment, but with a piston component thereof replaced with a diaphragm component, wherein FIG. 9 is included to illustrate an alternative configuration;

DETAILED DESCRIPTION WITH REFERENCE TO THE DRAWINGS

The following description is provided as an enabling teaching of the invention, is illustrative of principles associated with the invention and is not intended to limit the scope of the invention. Changes may be made to the embodiments depicted and described, while still attaining results of the present invention and/or without departing from the scope of the invention. Furthermore, it will be understood that some results or advantages of the present invention may be attained by selecting some of the features of the present invention without utilizing other features. Accordingly, those skilled in the art will recognize that modifications and adaptations to the present invention may be possible and may even be desirable in certain circumstances, and may form part of the present invention.

The invention relates to a pneumatic pressure controller for controlling air or fluid pressure of a pneumatic container or vessel such as a tire. The controller may be a mechanical controller or comparator.

Figure 5:
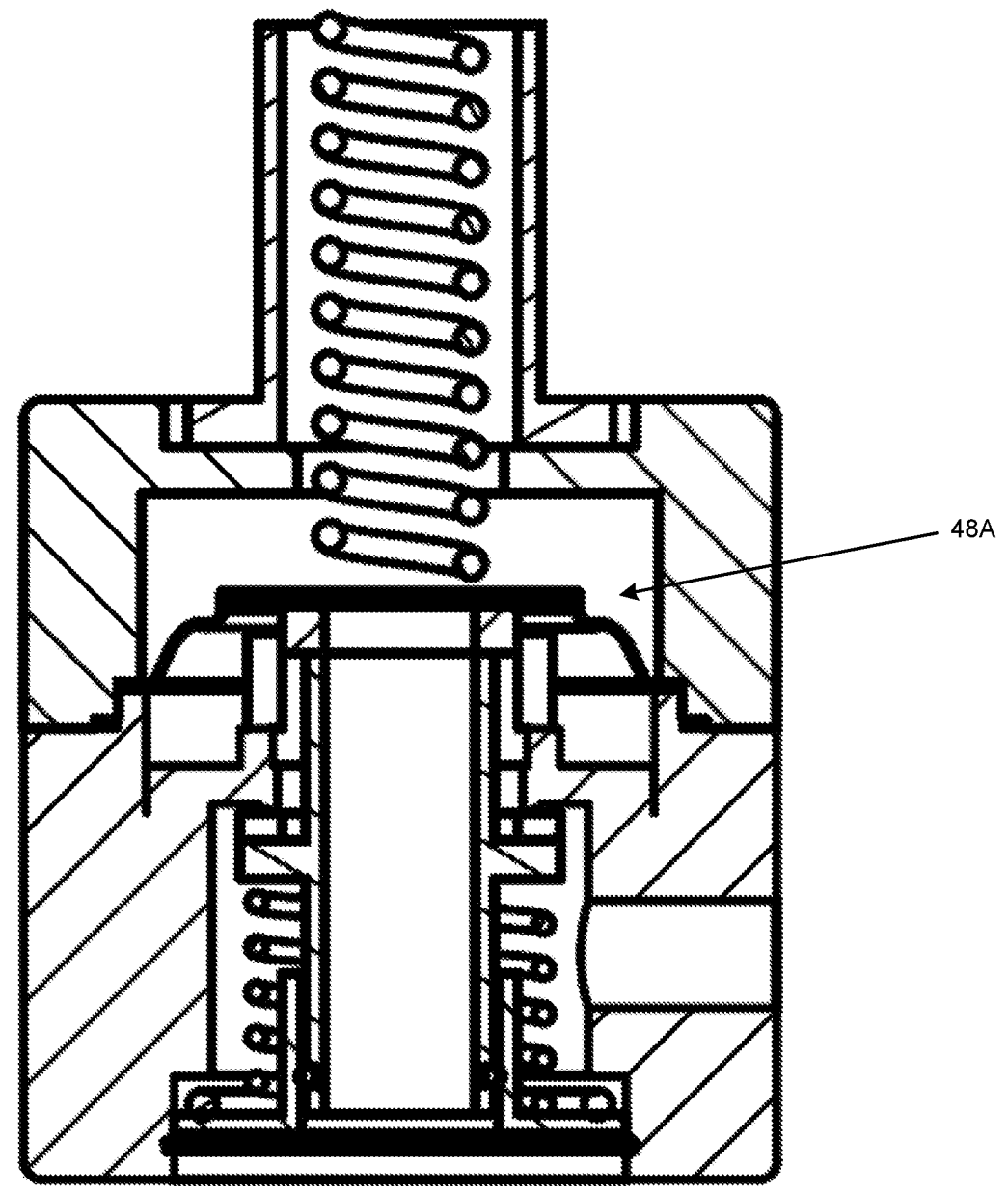
Figure 6:
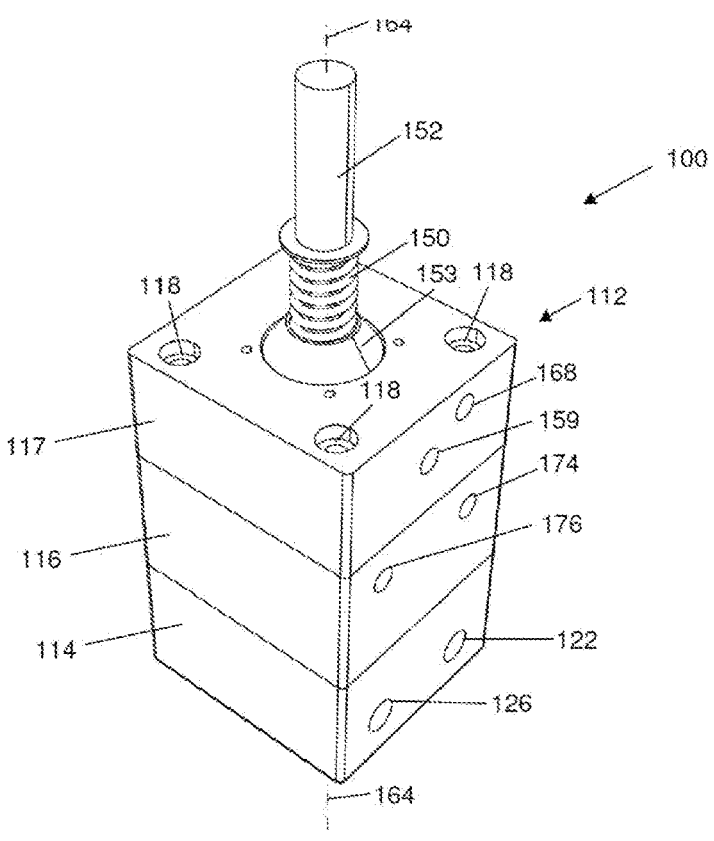
FIG. 6 is a three-dimensional view of a second exemplary embodiment of a pneumatic pressure controller.
Figure 7:
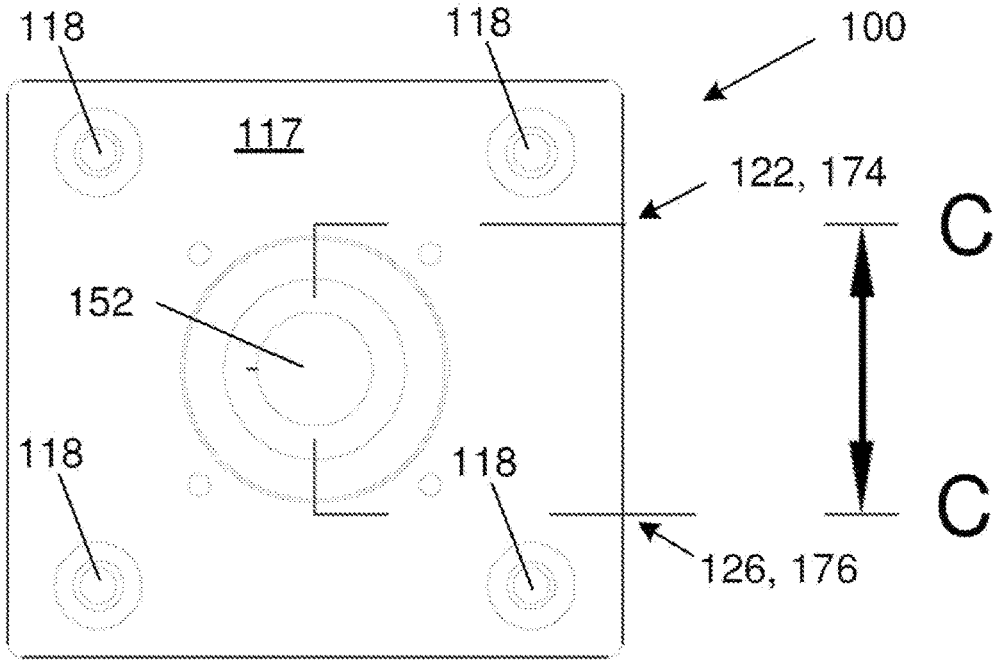
FIG. 7 is a top view of the controller of FIG. 6.
Figure 8:
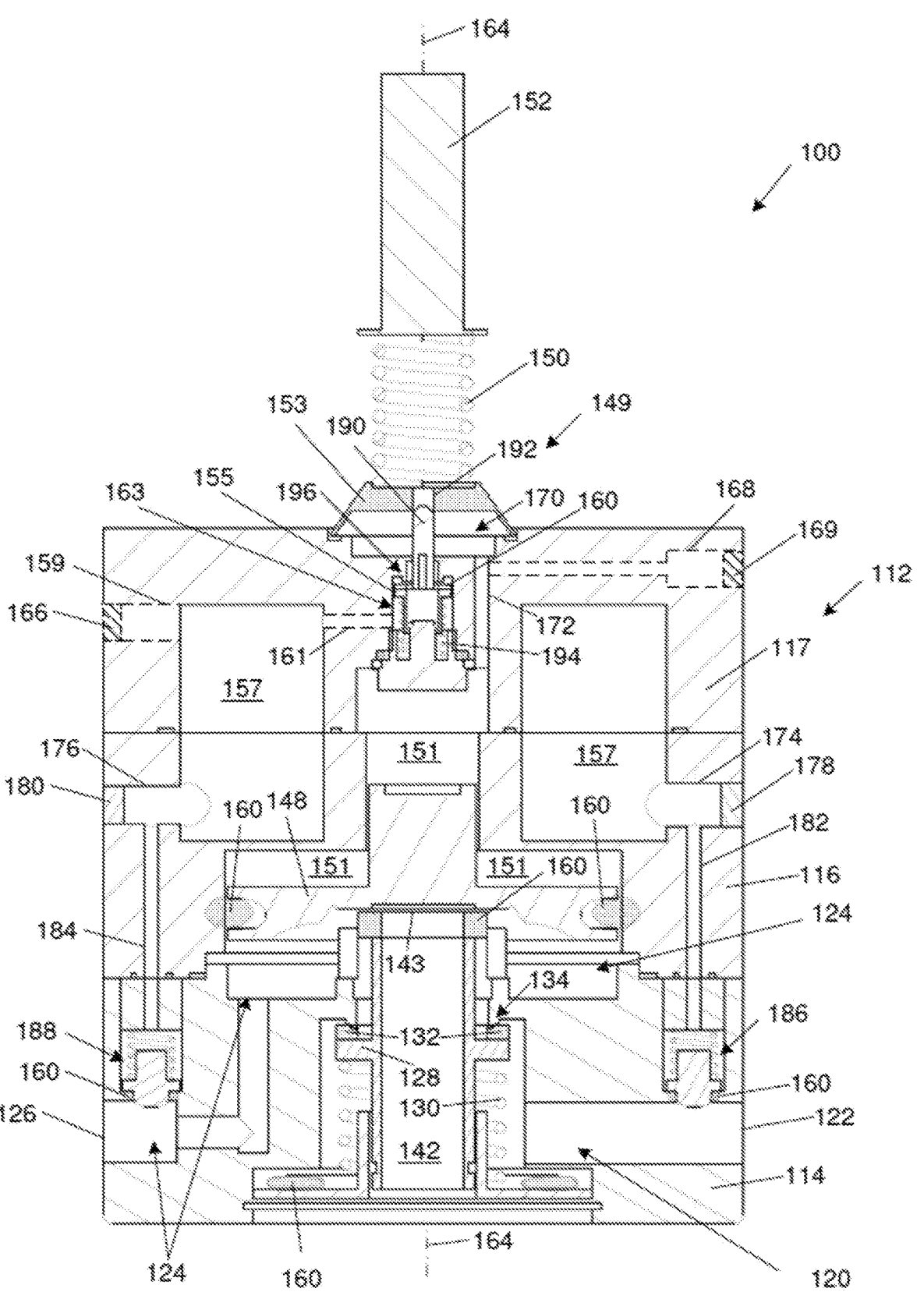
FIG. 8 is a sectional view taken along line C-C in FIG. 7 and shows internal components, a first port and a second port of the second embodiment of the controller.
Figure 9:
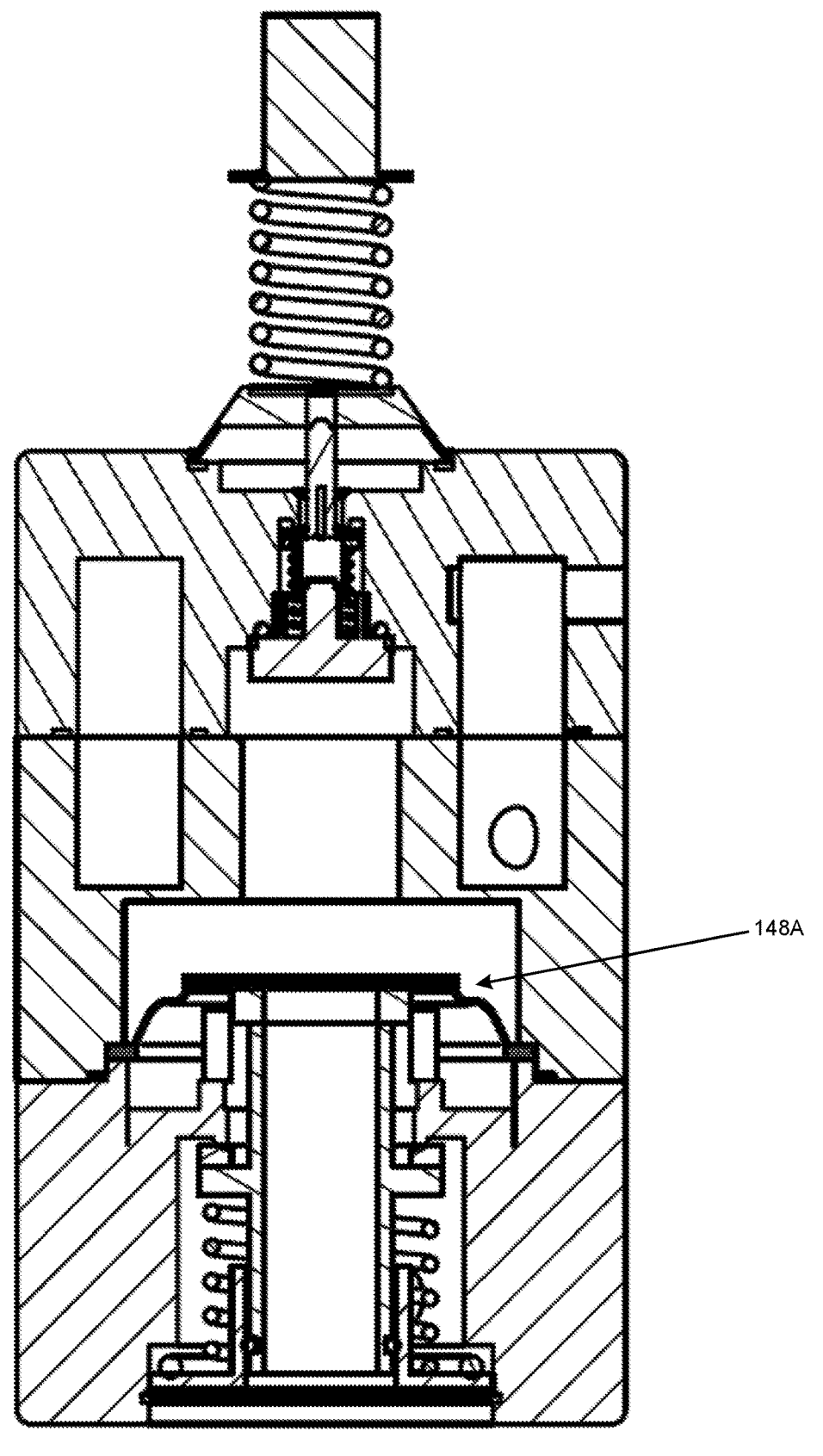
Figure 10:
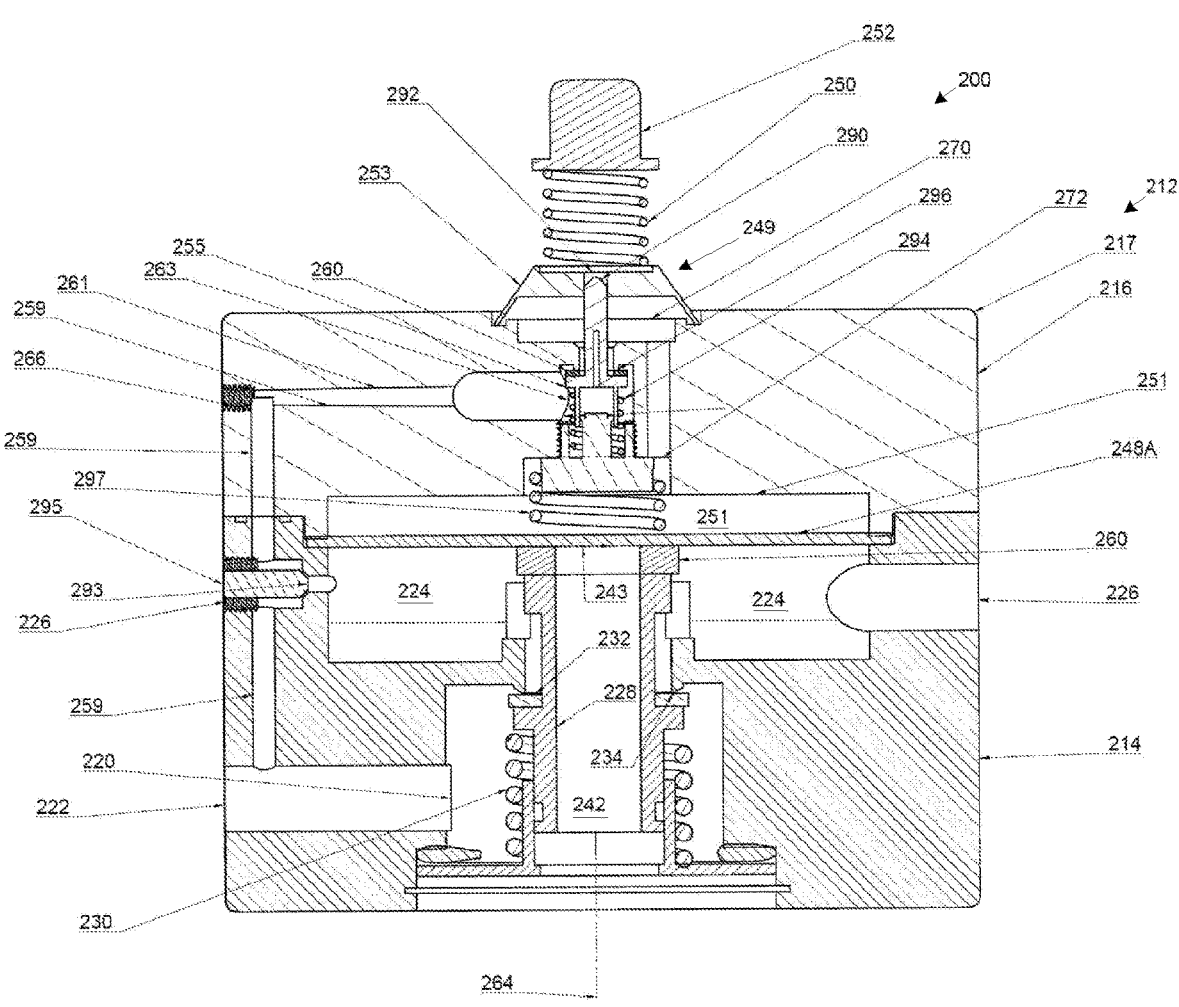
FIG. 10 is a sectional view showing internal components, a first port and a second port of a third exemplary embodiment of a pneumatic pressure controller.

One example of a two-part embodiment of the pneumatic pressure controller is generally designated by the reference numeral (10) in FIGS. 1 to 4. Another exemplary embodiment of the controller is generally designated by the reference numeral (100) and is shown in FIGS. 6 to 8, wherein the controller comprises three parts. FIGS. 5 and 9 have been included to show that a deflation diaphragm may be employed instead of a piston in the first and second embodiments. A third embodiment of the controller is generally designated by the reference numeral (200) and is shown in FIG. 10. A fourth embodiment of the controller is generally designated by the reference numeral (300) and is shown in FIGS. 11 to 14. These four embodiments (10, 100, 200, 300) are described in detail below.

In the example embodiments, the parts of the controller are secured to one another to form a body of the controller. These two-part and three-part embodiments of the controller are examples, and other arrangements are possible that do not utilize two or three parts, but that utilize a single part, or more than three parts. The body may for example be formed by casting of a single part.

Referring to FIGS. 1 to 4, there is shown a pneumatic pressure controller (10) including a body (12) having a first part (14) and a second part (16) that are secured or assembled to one another, for example using fasteners (18) such as bolts or screws. As is more evident from the sectional view in FIG. 3, the body (12) defines an input chamber (20) in fluid flow communication with a first port (22), and an output chamber (24) in fluid flow communication with a second port (26) (shown in FIG. 4). A plunger (28) may be provided and biased (30) towards a closed condition wherein it inhibits air or fluid flow from the input chamber (20) to the output chamber (24). In the exemplary embodiment, the bias of the plunger (28) is provided by a coil spring (30). In its closed condition a seal (32) or gasket of the plunger (28) abuts a contact surface (34) formed in the first part (14) of the body (12). The contact surface (34) may be appropriately sloped or angled and/or may comprise a contact point for engaging the seal (32) to facilitate sealing. A third port (36) and a gauge port (38) are also provided in the body (12). The third port (36) and gauge port (38) are described in more detail below. The first part (14) of the body (12) may define at least part of the input chamber (20) and the second part (16) of the body (12) may define at least part of the output chamber (24). In the embodiment shown, the output chamber (24) is formed at an interface between the first and second parts (14, 16) of the body (12) and adjacent the piston (48).

The plunger (28) may be moveable against its bias (30) in the direction of a first directional arrow (44) to an open condition wherein it allows air or fluid flow from the input chamber (20) to the output chamber (24) for inflation through the second port (26). Inflation may be performed utilizing pressure supplied through the first port (22), for example by connecting a compressor or pump (not shown) thereto. When the plunger (28) is in its open condition, air flow may be enabled as indicated by a second directional arrow (40).

The plunger (28) also includes a central vent (42) therein for deflation from the output chamber (24) in the direction of a third directional arrow (46). The controller (10) further includes a piston (48) which may be variably biased (50) towards a closed condition wherein it engages the plunger (28) and closes the vent (42) thereof. The variable bias is in the example embodiment provided by an adjustable spring (50) which is adjusted by turning a handle (52) (which may for example be a threaded handle which provides an adjustable axial force onto the spring (50)), thereby increasing tension in the spring (50) and applying a force in the direction of a fourth directional arrow (54) onto the piston (48). The piston (48) may, in turn, be configured to move the plunger (28) to its open condition against the bias (30) thereof, when the variable bias (50) of the piston (48) is increased, thereby enabling the airflow or fluid flow in the direction of the second directional arrow (40) as mentioned above.

The piston (48) may also be configured to move away from the vent (42) to its open condition under the influence of air or fluid pressure in the output chamber (24) when the plunger (28) is closed and the variable bias (50) on the piston (48) is reduced, thereby enabling air or fluid to deflate from the second port through the output chamber (24) through the vent (42) as indicated by the third directional arrow (46). The plunger (28) may be slidably mounted to the body (12) and into a flange (56). A mounting recess (58) may also be provided for mounting the flange (56) to the body (12) with a circlip or the like (not shown). A dust cover may be provided at the outlet (also not shown). A plurality of O-rings (60) may be provided for pneumatically sealing various components, chambers or passages of the controller (10). The piston (48) may, in turn, be slidably mounted to the second part (16) of the body (12). A seal (60) is also provided between the piston (48) and an accommodating cylinder (61) formed in the second part (16) of the body (12).

Figure 1:
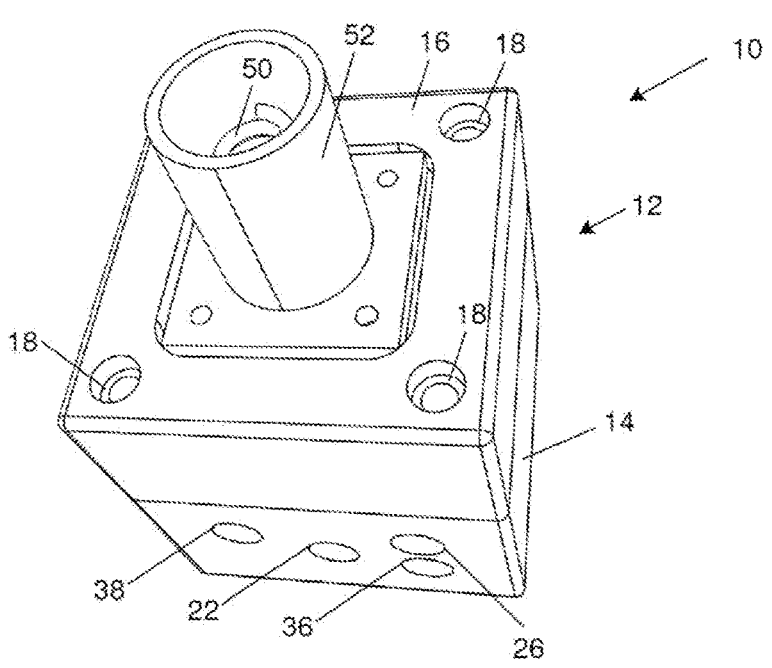
FIG. 1 is a three-dimensional view of a first exemplary embodiment of a pneumatic pressure controller.
Figure 2:
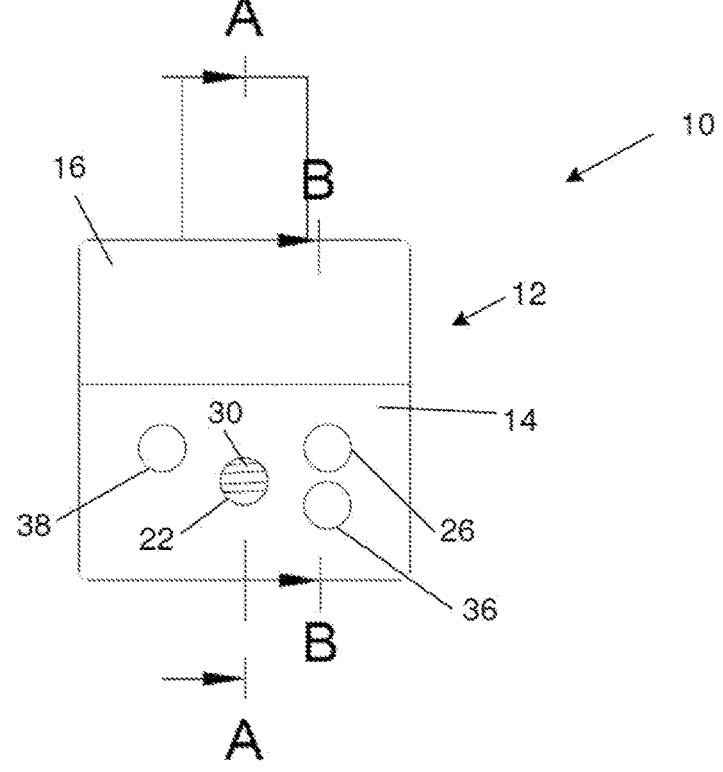
FIG. 2 is a front view of the controller of FIG. 1 showing a first port and a second port thereof.
Figure 3:
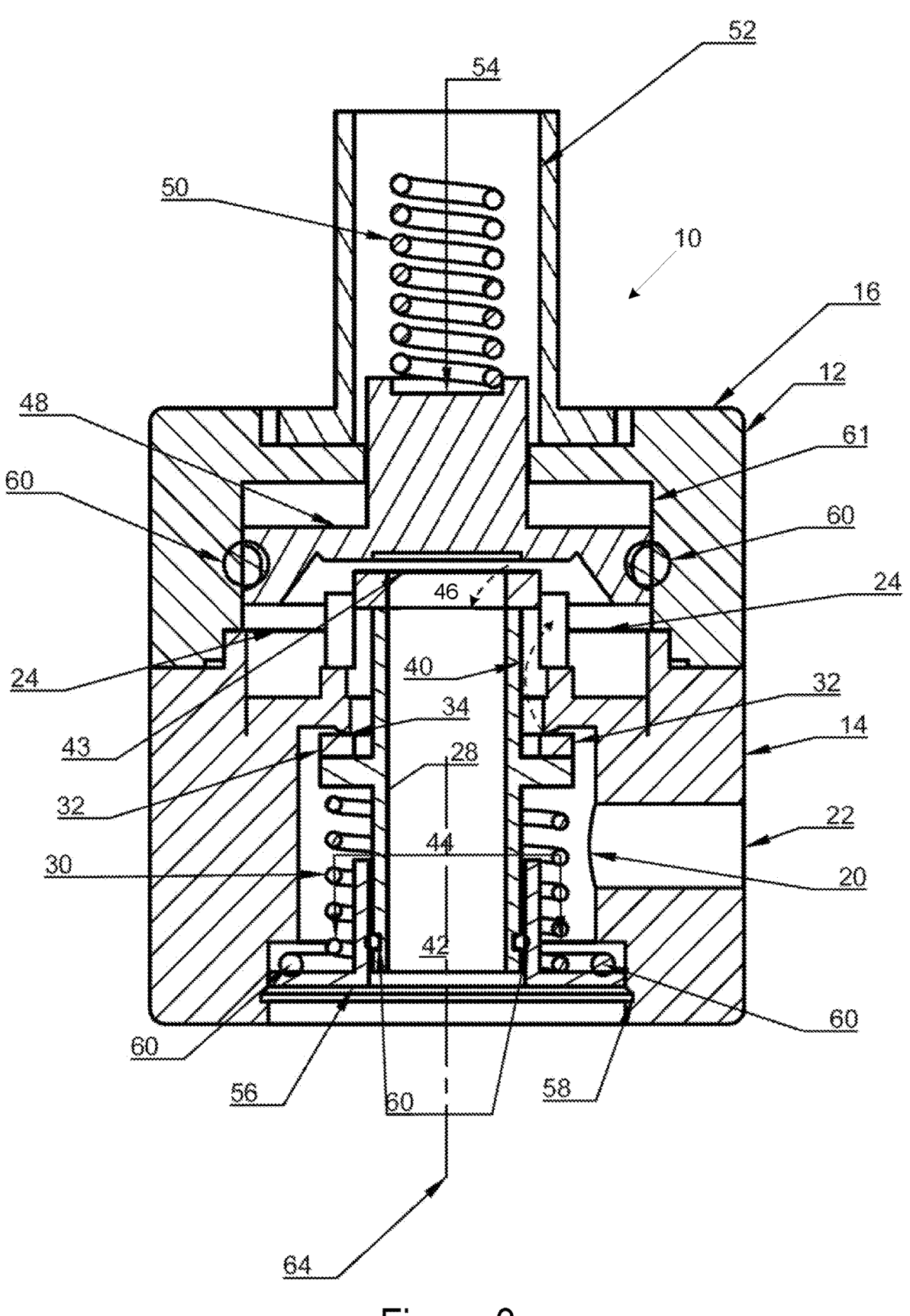
FIG. 3 is a sectional view taken along line A-A in FIG. 2 and shows internal components of the controller of FIG. 1.
Figure 4:
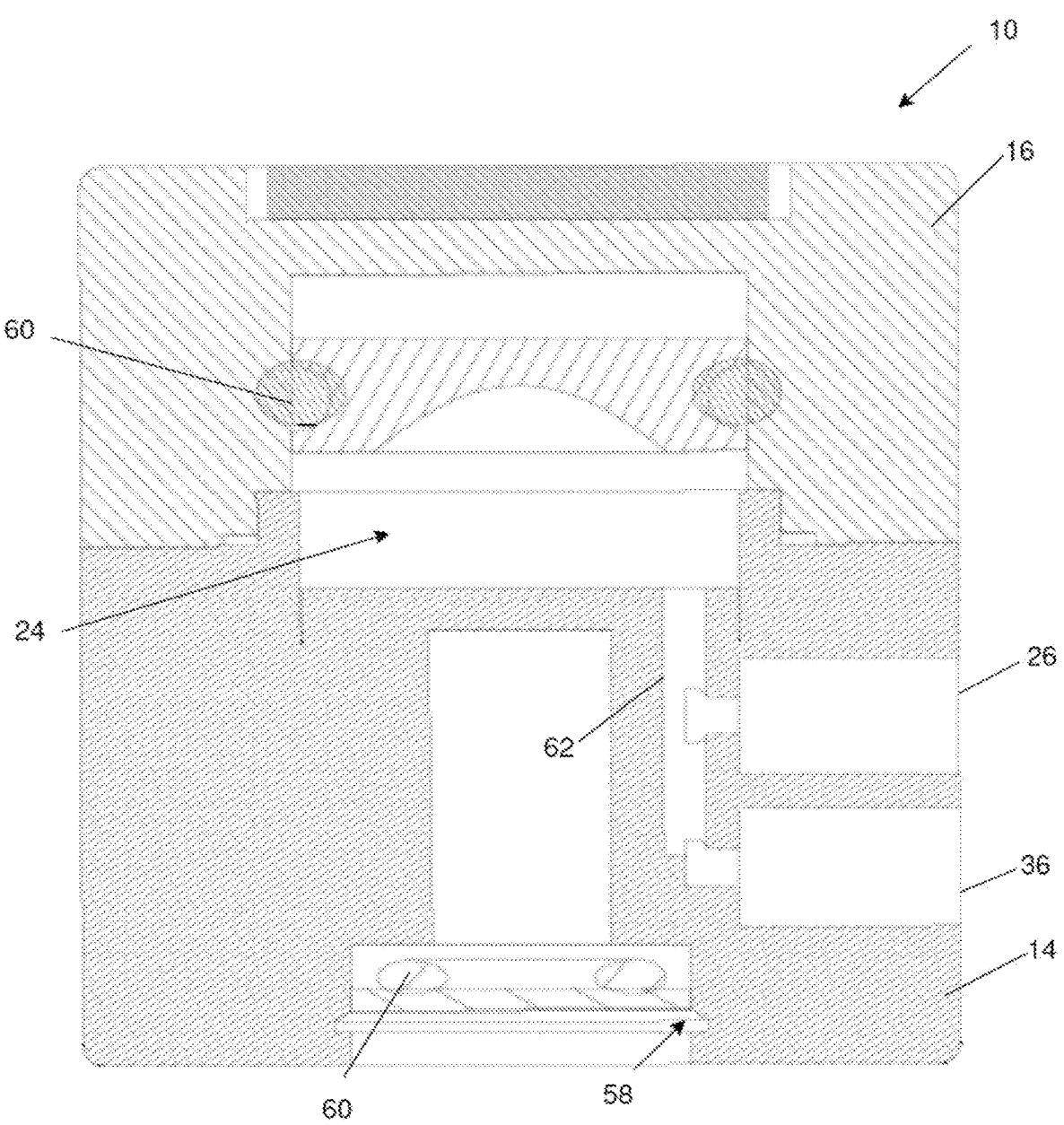
FIG. 4 is a sectional view taken along line B-B in FIG. 2, showing the second port and a gauge port of the controller of FIG. 1 in more detail.

As is more evident from FIG. 4, a communication passage (62) is provided in the first part (14) of the body (12) between the output chamber (24) and the second and third ports (26, 36). By adjusting the variable bias (50) on the piston (48) the controller is enabled to mechanically control the pneumatic pressure in the output chamber (24).

In use, for inflation, a compressor or pump may be connected to the first port (22), and the second port (26) may be connected to one or more tires or other pneumatic containers to be inflated. As mentioned, a gauge (not shown) may be connected to the gauge port (38) for indicating pressure in the output chamber (24). The gauge port may be connected to the output chamber (24) through a gauge passage (not shown), similar to the communication passage (62) shown in FIG. 4. The adjustable spring (50) may be adjusted by a user of the controller (10) to set it to a required output pressure. The compressor or pump then pressurizes the input chamber (20), while the tire pressure pressurizes the output chamber (24). Hence, the plunger (28) is subjected to a biasing force of biasing spring (30) in an opposite direction to the first directional arrow (44) as well as a force as result of pneumatic pressure in the input chamber (20). The piston (48) on the other hand, is subjected to a biasing force of the adjustable spring (50) in the direction of the fourth directional arrow (54) and to a force as result of pneumatic pressure in the output chamber (24) in an opposite direction to the fourth directional arrow (54). When the piston (48) abuts the plunger (28) it also applies an axial force thereto, in line with a major axis (64) of the body (12). When the input chamber (20) is pressurized, the pressure and spring (30) may cause the seal (32) to abut with contact surface (34) and to inhibit air or fluid flow. However, when the pressure in the output chamber (24) (i.e. the tire pressure) is relatively low and the force applied to the piston (48) by the adjustable spring (50) is relatively high, then the piston will move towards the plunger (28) and close the vent (42) thereof, and (if the forces acting on the piston are large enough) move the plunger (28) against its bias (30) and against the pressure in the input chamber (20) to its open condition, thereby enabling air or fluid flow from the input chamber (20) to the output chamber (24) to inflate the tire through the second port (26). This inflation will continue until the pressure in the output chamber (24) becomes high enough to cause the piston (48) to move in a direction opposite to the fourth directional arrow (54), causing the plunger also to move in that direction to its closed condition. Air or fluid flow from input chamber (20) to output chamber (24) may accordingly slow and eventually stop. This may happen when the pressure in the tire and thus the output chamber (24) rises and that pressure, plus the pressure (or force) from the plunger (28) in the opposite direction than fourth directional arrow (54), eventually becomes about equal to the pressure (or force) from the spring (50) on the piston (48), thereby completing inflation of the tire to the required or set pressure.

It will be appreciated that the body has/defines a major axis (64), and the piston (48) and/or the plunger (28) may respectively be slidably moveable along the major axis (64) of the body (12).

The vent (42) of the plunger (28) may also be provided along the major axis (64) of the body (12).

For deflation, the user adjusts the variable bias of spring (50) and thereby reduces the force applied to the piston (48) by the spring (50), which force may now be less than the force applied to the piston (48) by the pressure in output chamber (24). As result, the piston (48) moves in an opposite direction to the fourth directional arrow (54) and disengages or moves away from an opening (43) of the vent (42) of the plunger. This causes air or fluid to deflate from the output chamber (24) (i.e. from the tire) through the central vent (42) in the plunger (28). This deflation process may provide rapid deflation due to the vent being centrally disposed in the plunger and due to the vent having a substantial diameter relative to that of the second port (26), or due to the diameter of the vent being at least equal to or larger than that of the second port (26). As will be evident to a person skilled in the art, the controller (10) enables the inflation and/or deflation process to stop automatically when the pressure in the output chamber (24) has reached the set pressure (i.e. the pressure applied by the spring (50) on the piston (48)). The inflation and/or deflation may occur continuously, without requiring intermittent interruptions to check or electronically sense the tire's pressure. The controller (10) may provide a mechanical pressure controller which does not utilize or require any electronics which may provide advantages such as, but not limited to, robustness and reliability.

In an alternative configuration, a deflation diaphragm component (48A) may be employed instead of the deflation piston (48), with the remainder of the components as well as the functioning of the controller (10) remaining substantially the same. An example of this is shown in FIG. 5. The controller shown in FIG. 5 is similar to the controller (10) and it is thus not further described to avoid repetition. The primary distinguishing feature, being the deflation diaphragm (48A), is not explained in detail with reference to FIG. 5, because the third and fourth embodiments (200, 300) described with reference to FIGS. 10 to 14 below set out examples of such components in detail.

A second embodiment (100) of the controller is shown in FIGS. 6 to 8. In this embodiment, the controller (100) comprises a body (112) which extends along a major axis (164) and includes a first part (114), a second part (116) and also a third part (117). The first, second and third parts (114, 116, 117) are mounted and then secured to one another, for example using fasteners (118). As is more evident from the sectional view in FIG. 8, in this embodiment, an input chamber (120) is formed in the first part (114) of the body (112), in a similar way to the input chamber (20) described above with reference to FIGS. 1 to 4. The input chamber (120) of this embodiment is also in fluid flow communication with a first port (122) of the controller (100), and an output chamber (124) is provided in fluid flow communication with a second port (126). This embodiment may also include a plunger (128) which may be biased with a spring (130) towards a closed condition wherein it inhibits air or fluid flow from the input chamber (120) to the output chamber (124). The plunger (128) may be moveable against its bias (130) to an open condition wherein it allows air or fluid flow from the input chamber (120) to the output chamber (124) for inflation through the second port (126). The plunger has a central vent (142) therein for deflation from the output chamber (124), and a piston (148) which is variably biased (150, 151) towards a closed condition wherein it engages the plunger (128) and closes an opening (143) of the vent (142 thereof. This variable bias (150,151) is applied to the piston (148) by means of an adjustable regulator (149) which includes an adjustable spring (150), an inflation diaphragm (153) (also referred to in this specification as a "regulator diaphragm") and a regulator plunger (155). The regulator (149) is in turn connected to a piston biasing chamber (151) for biasing the piston (148) utilizing pneumatic pressure from an air or fluid reservoir (157) provided in the body (112). The reservoir (157) may be defined internally of the body (112) by the second or third parts (116, 117), and/or by the second and third parts collectively. The regulator (149), the reservoir (157), the piston biasing chamber (151) and their respective functions will be described in more detail below.

Similar to the embodiment of the controller (10) described above with reference to FIGS. 1 to 4, in the embodiment of the controller (100) shown in FIGS. 6 to 8, the piston (148) is configured to move the plunger (128) to its open condition against the bias (130) thereof when the variable bias (151) on the piston (148) is increased, and to move away from the vent (142) to its open condition under the influence of air or fluid pressure in the output chamber (124) when the plunger (128) moves to its closed position and the variable bias (151) on the piston (148) is reduced, thereby enabling air or fluid to deflate from the second port (126) through the output chamber (124) through the vent (142). However, in this embodiment of the controller (100), the variable bias (151) on the piston (148) is provided by air or fluid pressure in the piston biasing chamber (151) (instead of the adjustable spring (50) in FIG. 3). A first blind hole (159) (shown in broken lines in FIG. 8) may be provided in the third part (117) of the body (112) to form a passage (161) between the reservoir (157) and a first regulator chamber (163) which may be formed in the third part (117) of the body (112). The first blind hole (159) may then be closed with a first plug (166). A second blind hole (168) (also shown in broken lines in FIG. 8) may also be provided to form a gauge port (168) which may be in fluid flow communication with a second regulator chamber (170) adjacent the inflation diaphragm (153). It should be appreciated that the first and second blind holes (159, 168) are shown in broken lines for illustrative purposes, because in the exemplary embodiment they would not have been visible in the sectional view C-C shown in FIG. 8.

A pilot passage (172) may be provided between the second regulator chamber (170) and the piston biasing chamber (151). The gauge port (168) may also be closed with a plug (169), when not in use, or may be connected to a gauge (not shown) for measuring the pressure in the second regulator chamber (170) and/or the pressure in the piston biasing chamber (151). Third and fourth blind holes (174, 176) may be provided in the second part (116) of the body (112) and each provided with a plug (178, 180). The third and fourth blind holes (174, 176) may be provided to enable a first reservoir supply passage (182) and a second reservoir supply passage (184) to be formed in the second part (116) of the body (112), for example by drilling.

The first reservoir supply passage (182) is in fluid flow communication with the input chamber (120) and the second reservoir supply passage (184) is in fluid flow communication with the output chamber (124). As shown in FIG. 8, a first unidirectional valve or one-way valve (186) (also referred to as a check-valve or a non-return valve) may be provided in the first reservoir supply passage (182) to enable fluid flow from the input chamber (120) to the reservoir (157), but not vice versa. A second unidirectional valve or one-way valve (188) may be provided in the second reservoir supply passage (184) to enable fluid flow from the output chamber (126) to the reservoir (157), but not vice versa.

As with the embodiment of the controller (10) described above with reference to FIGS. 1 to 4, the controller of FIGS. 6 to 8 may also include a plurality of seals (160), O-rings or gaskets for pneumatically sealing the various parts, chambers, passages and components thereof. Referring to the regulator (149) in FIG. 8, the regulator plunger (155) operates in a similar fashion to the plunger (28) as described above with reference to FIGS. 1 to 4, however, the regulator plunger (155) further includes a pin (190). The pin (190) is arranged to engage with an accommodating opening (192) of the inflation diaphragm (153), and to close the opening (192) therein when the pin abuts with the inflation diaphragm (153). Fine tuning of the second regulator chamber (170) may hence be performed by adjusting a handle rod (152) (or by adjusting a handle (not shown) that engages with the handle rod) and allowing air or fluid to escape from the opening (192). The opening (192) in the regulator's inflation diaphragm (153) may deflate the pressure in chamber (151) when the pressure (or tension) on the spring (150) is reduced.

The regulator plunger (155) is also biased, for example with a spring (194) towards a closed condition wherein it inhibits air or fluid flow from the first regulator chamber (163) to the second regulator chamber (170) when a seal (160) thereof abuts with a cooperating contact surface (196) provided in the third part (117) of the body (112). When the user adjusts the adjustable spring (150) with the handle rod (152) and increases the variable bias, the inflation diaphragm (153) abuts and engages with the pin (190) pushing it and moving it towards the first regulator chamber (163), thereby causing the regulator plunger (155) to move to its open condition and to allow air or fluid to flow between the first and second regulator chambers (163, 170) (i.e. air or fluid is enabled to flow between the reservoir (157) and the piston biasing chamber (151)). Hence, if the pressure in the reservoir (157) is higher than the pressure in the piston biasing chamber (151) and the regulator plunger (155) is moved to its open condition through the pin (190), air or fluid may flow from the reservoir (157) through the passage (161), into the first regulator chamber (163), past the regulator plunger (155), into the second regulator chamber (170) and through the pilot passage (172) to the piston biasing chamber (151).

Still referring to the embodiment depicted in FIGS. 6 to 8, for inflation in use, the required pressure may be adjusted by adjusting the handle and the handle rod (152) of the regulator (149) so that the tension in the spring (150) and accordingly the force it exerts onto the inflation diaphragm (153) is at a predetermined or selected level. As mentioned, the pressure gauge may also be connected to the gauge port (168), allowing the user to observe the set pressure (i.e. the pressure in the piston biasing chamber (151) and/or the pressure in the second regulator chamber (170)). This may be referred to as a pilot pressure which regulates or controls the movement of the piston (148). Alternatively other arrangements are possible wherein the gauge is connected to the output chamber (124), wherein instead of being connected to the second regulator chamber (170) and the piston biasing chamber (151), the pressure gauge may be connected to the output chamber (124) so that the pressure in the tire may be observed.

As described above, a compressor (not shown) may be connected to the first port (122) and may provide air or fluid pressure in the input chamber (120). As result of the air or fluid pressure in the input chamber (120) and the bias in the spring (130), a seal (132) of the plunger (128) abuts with a contact surface (134) and inhibits air or fluid flow between the input chamber (120) and the output chamber (124).

For example purposes, it is assumed that the second port (126) is not connected to a tire, but is instead open to the atmosphere. The compressor is now connected as described above, and air or fluid is supplied by it to the input chamber (120). First one-way valve (186) accordingly moves to an open state and allows air or fluid from the input chamber (120) to pass through the first reservoir supply passage (182) and to enter the reservoir (157) and eventually into the first regulator chamber (163). The first one-way valve (186) and the second one-way valve (188) enables pressure in the reservoir (157) to remain therein and inhibits air or fluid from flowing back to the input chamber (120) or the output chamber (124) from the reservoir (157). The reservoir (157) supplies pressure for the first and second regulator chambers (163, 170) and also for the piston biasing chamber (151) through the pilot passage (172). In this example, the reservoir (157) may hence be pre-pressurized by a compressor, if necessary.

In this embodiment (100), a plurality of forces are hence acting on the piston (148), including:

(a) a force as result of pressure in the piston biasing chamber (151) (which depends on: the pre-determined adjustment of the spring (150), the pressure in the reservoir (157), and the pressure exerted by the inflation diaphragm (153) onto the second regulator chamber (170), the pilot passage (172) and the piston biasing chamber (151));

(b) a force as result of pressure in the output chamber (124); and (c) a force as result of the bias (130) (and the force on the plunger caused by pressure in the input chamber) of the plunger (128) when it abuts with the piston (148).

It is now assumed that a tire or other pneumatic container is connected to the second port (124). If the tire is relatively deflated, the pressure in the output chamber (124) will be less than the pressure in the input chamber (120) which is connected to the compressor or pump. It will be appreciated that friction and other losses are also at play, but movement of the piston (148) may be initiated if one or more of the forces mentioned above are adjusted or changed. When the pressure in the piston biasing chamber (151) is large enough (due to the adjustment of the regulator (149) and due to the air or fluid supply to it through the first reservoir supply passage (182)), the piston moves away from the piston biasing chamber (151) and engages with the plunger (128) (while also closing the vent (142) thereof), pushing the plunger (128) to its open condition, and enabling air or fluid to flow from the input chamber (120) to the output chamber (124) for inflation through the second port (126). Once the pressure in the output chamber (124) becomes closer to or equal to the pressure in the piston biasing chamber (151), the plunger (128) moves towards the piston biasing chamber (151), towards its closed position and the air or fluid flow from the input chamber (120) to the output chamber (124) may slow and eventually stop when the plunger again moves to its closed condition with its seal (132) pressing against the contact surface (134). Stated differently, when the pressure in the output chamber (124) is less than the pressure in the piston biasing chamber (151), the piston may move, and if the pressure in the piston biasing chamber (151) is also large enough to overcome the forces acting on the plunger (128) (inter alia the force from the spring (130) and the pressure in the input chamber (120)), the piston (148) may move the plunger (128) to its open position, allowing air to inflate to the tire through the second port (126).

When a tire (or other pressurized container, or a plurality of tires) is on the other hand relatively inflated it may be connected to the second port (126) for deflation, without requiring a compressor or pump to be connected to the first port (120). It is now assumed the input chamber (120) is not connected to a compressed air supply. When a relatively inflated tire is now connected to the second port (126), the pressure from the tire itself enters the output chamber (124). The plunger (128) is in its closed condition due to the bias of the spring (130). The second one-way valve (188) may now be moved to an open condition and air or fluid from the output chamber (124) and from the tire may now flow to the reservoir (157) through the second reservoir supply passage (184). Hence, using air or fluid from the container or tire itself through the second port (126), air or fluid may be supplied: to the reservoir (157), to the first and second regulator chambers (163, 170), to the pilot passage (172) and to the piston biasing chamber (151).

If a user now desires to deflate the tire, the regulator (149) may be adjusted as mentioned above, by adjusting the spring (150) and hence decreasing the pressure in the second regulator chamber (170). This is referred to as the set pressure which can be observed through the gauge on the gauge port (168). Air or fluid will then flow as described above, from the tyre to the piston biasing chamber (151) by way of flowing through the output port (126), through the second one-way valve (188), through the second reservoir supply passage (184), through the reservoir (157), through the first and second regulator chambers (163, 170) and eventually through the pilot passage (172).

The adjustable biasing force from the spring (150) engages the inflation diaphragm (153) and causes it to push down on the regulator pin (190) and regulator plunger (155) and thus opening the airflow from the first regulator chamber (163) to the second regulator chamber (170) and thereby pressurizing the second regulator chamber (170). As mentioned, when this biasing force is reduced, air or fluid may be enabled to escape through the opening (192) in the inflation diaphragm (153), reducing pressure in the second regulator chamber (170). On the other hand, when the biasing force is increased, the inflation diaphragm (153) moves the pin (190) and the regulator plunger (155) to allow air or fluid from the first regulator chamber (and from the reservoir (157)) to be conveyed through the second regulator chamber (170) and the pilot passage (172) to the piston biasing chamber (151) (with the opening (192) held closed by the pin (190)). The handle may comprise a screw (not shown) for moving the handle rod (152) to press against the bias of the spring (150) and to increase (or decrease) the pressure in the second regulator chamber (170).

When the user now turns the handle to reduce pressure, the pressure in the piston biasing chamber (151) is reduced, which causes a balance of forces acting on the piston (148) to be changed so that the piston (148) moves away from the opening (143) of the vent (142) in the plunger (128), thereby allowing air or fluid to deflate from the output chamber (124) (and from the tire) out of the vent (142). The user may accordingly adjust the regulator (149) to adjust the pressure in the piston biasing chamber (151), to deflate the tire through the vent (142), until the required pressure in the tire is reached, whereupon the piston (148) may again move to abut with the seal (160) of the plunger (128) to close the vent (142) thereof, ending the deflation process. In this embodiment, the deflation is hence controlled through the pilot passage (172) and by a difference in pressure between the pressure in the piston biasing chamber (151) and the pressure in the output chamber (124).

The controller (100) is accordingly configured to enable deflation of the tire or pneumatic container through the vent (142) when the compressor or pump is disconnected from the first port (122) by utilizing internal pressure in the reservoir (157) and by utilizing pressure from the container or tire itself through the second reservoir supply passage (184).

The reservoir (157) is in fluid flow communication with the pressure regulator (149) and the variable bias on the piston (148) is in this embodiment provided by pneumatic pressure applied to it by the regulator (149) utilizing pressure from the reservoir (157) through the piston biasing chamber (151). The regulator plunger (155) and inflation diaphragm (153) are variably biased using the adjustable spring (150) and are arranged to open or close the regulator plunger (155). The regulator (149) is configured to regulate pressure in the piston biasing chamber (151) by adjustment of the variable bias (150) on the inflation diaphragm (153), such that an increase in the variable bias on the inflation diaphragm (153) causes the regulator plunger (155) to move to its open position enabling air or fluid from the reservoir (157) to enter the second regulator chamber (170) through the first regulator chamber (163) and to be conveyed to the piston biasing chamber (151), thereby applying a force on the piston (148) as result of the adjustment of the variable bias on the inflation diaphragm (153). In the embodiment of the invention, the piston biasing chamber (151) may be at least partially defined by the third part (117) of the body (112) and/or collectively by the second and third parts (116, 117) of the body (112).

The pilot passage (172) may provide a functionality similar to a small transistor driving a large transistor. The controller (100) in the embodiment shown in FIGS. 6 to 8 may provide the advantage of pressure in the tire or other pneumatically pressurized container being used to provide pressure to the reservoir (157) which in turn facilitates adjustment of the regulator (149) because the reservoir pressure indirectly also provides pressure to the piston biasing chamber (151). For deflation, when the regulator (149) is adjusted to expose the opening in the inflation diaphragm (153) thereof, the second regulator chamber (170) and the piston biasing chamber (151) are deflated, enabling the piston (148) to move away from the plunger (128), thereby exposing the vent (143) so that the tyre may be deflated. A required force to turn the handle (152) of the regulator (149) may be reduced (in comparison to the required force to turn the handle (52) in the controller (10)) as result of the arrangement and/or interconnection of the first and second regulator chambers (163, 170), the piston biasing chamber (151) and the reservoir (157).

In an alternative configuration, a deflation diaphragm component (148A) may be employed instead of the piston (148), with the remainder of the components as well as the functioning of the controller (100) remaining substantially the same or with minor design variations between them. An example of this is shown in FIG. 9. The controller shown in FIG. 9 is similar to the controller (100) and it is thus not further described to avoid repetition. The primary distinguishing feature, being the deflation diaphragm (148A), is not explained in detail with reference to FIG. 9, because the third embodiment (200) described with reference to FIG. 10 below sets out an example of such a component in detail.

Turning now to the third embodiment (200) of the controller which is shown in FIG. 10, the controller (200) comprises of body (212) which extends along a major axis (264) and includes a first part (214) and a second part (216). The first and second parts (214, 216) are mounted to one another, for example using fasteners (not shown). As is evident from the sectional view in FIG. 10, in this exemplary embodiment, an input chamber (220) is formed in the first part (214) of the body (212), in a similar way to the input chamber (20) described above with reference to FIGS. 1 to 4.

The input chamber (220) is in fluid communication with a first port (222) of the controller (200), and an output chamber (224) is provided in fluid flow communication with a second port (226). The first port (222) is also known as an "input port" and the second port (226) is also known as an "output port".

The controller (200) includes a plunger (228) which is biased with a coil spring (230) and pressure in the input chamber (220) towards a closed condition wherein it inhibits air or fluid flow from the input chamber (220) to the output chamber (224). The plunger (228) may be moveable against its bias (230) to an open condition wherein it allows air or fluid flow from the input chamber (220) to the output chamber (224) for inflation through the output port (226). The plunger (230) has a central vent (242), extending along the major axis (264), for deflation from the output chamber (224).

A deflation diaphragm (248A) is variably biased towards a closed condition wherein it engages upper walls of the plunger (228) and closes an opening (243) of the vent (242) thereof. This variable bias is applied to the deflation diaphragm (248A) by means of an adjustable regulator (249) which includes an adjustable spring (250), a regulator inflation diaphragm (253) and a regulator plunger (255). The regulator (249) is in turn connected to a biasing chamber (251) for biasing the deflation diaphragm (248A) utilizing pneumatic pressure generated in a second regulator chamber (270) by the functioning of the regulator (249). The functioning of the regulator (249) and the diaphragm biasing chamber (251) will be described in more detail below.

Similarly to the piston (148) in the second embodiment of the controller (100) described above with reference to FIGS. 6 to 8, in the third embodiment (200), the deflation diaphragm (248A) is configured to move the plunger (228) to its open condition against the bias (230) thereof when the variable bias (251) on the deflation diaphragm (248A) is increased, and to move away from the vent (242) to its open condition under the influence of the air or fluid pressure in the output chamber (224) when the plunger (228) is closed and the variable bias (251) on the deflation diaphragm (248A) is reduced. This enables air or fluid to deflate from the output port (226) through the output chamber (224) and through the vent (242). The variable bias on the deflation diaphragm (248A) is provided by air or fluid in the diaphragm biasing chamber (251) (instead of directly with an adjustable spring as is the case in the first embodiment). A first blind hole (261) may be provided in the second part (216) of the body (212).

In this embodiment, the hole (261) is connected to an internal passage (259) at a 90 degree angle, as shown in FIG. 10. This forms a fluid path between a first regulator chamber (263) and the input chamber (220). The first blind hole (261) may be closed with a plug (266). An adjustable passage (293) extends transversely through the passage (259), between the hole (261) and the chamber (220).

A pilot passage (272) may be provided between the second regulator chamber (270) and the biasing chamber (251). This pilot passage (272) allows for the adjustment of pressure in the second regulator chamber (270), which is adjusted by adjusting the variable bias (250) to achieve the required pressure in the second regulator chamber (270), to be present in the biasing chamber (251) and as such provide the biasing pressure for the deflation diaphragm (248A).

A closable opening of the adjustable passage (293) determines the amount of air or fluid able to flow between the passage (259) and the output chamber (224). The opening is adjustable by turning an adjustment screw (295) fitted in the passage (293) either inwardly (towards the chamber (224)) or outwardly (away from the chamber (224)). This adjustment allows for a minimal amount/level of flow between the input chamber (220) and the output chamber (224) during the inflation process, while still allowing for an adequate amount of air to flow from the output chamber (224) to the first regulator chamber (263) to allow proper functioning of the regulator (249) during the deflation process. The adjustable screw (295) can also be replaced with a one-way-valve, similar to the valve (188), that will allow air or fluid to flow from the output chamber (224) to the passage (295), but not vice versa. This allows air to be supplied to the first regulator chamber (263) in a similar way as described in embodiment (100) of the controller, where the deflation process can be operated without the use of an air pressure source such as a compressor, in that the air required by the regulator (249) to function, is supplied by the vessel or tire that is connected for deflation instead of by a compressor.

Referring to the regulator (249) in FIG. 10, the regulator (249) operates in substantially the same way as the regulator (149) of the second embodiment. Accordingly, fine tuning of the second regulator chamber (270) may also be performed by turning the handle rod (252) and allowing air or fluid to escape from the opening (292). The opening (292) in the regulator's inflation diaphragm (253) may deflate the pressure in the biasing chamber (251) when the pressure (or tension) in the spring (250) is adjusted. The regulator plunger (255) is also biased, for example with a coil spring (294) towards a closed condition wherein it inhibits air or fluid flow from the first regulator chamber (263) to the second regulator chamber (270) when a seal (260) thereof abuts with a cooperating contact surface (296) provided in the second part (212) of the body (212). When the user adjusts the adjustable spring (250) with the handle rod (252) and increases the variable bias, the inflation diaphragm (253) abuts and engages with the pin (290) pushing it and moving it towards the first regulator chamber (263), thereby causing the regulator plunger (255) to move to its open condition and to allow air or fluid to flow between the first and second regulator chambers (263, 270) (i.e. air or fluid is enabled to flow between the first regulator chamber (263) and the biasing chamber (251)).

When the pressure in the second regulator chamber (270) increases to equal to that of the force on the inflation or regulator diaphragm (253), the regulator diaphragm (253) will be pressed towards the spring (250) sufficiently far enough to allow the spring (294) to push the regulator plunger (255) away (upwards) from the first regulator chamber (263) and push the regulator plunger (255) against the coordinating surface (296) thereby stopping any air of liquid flow from the first regulator chamber (263) to the second regulator chamber (270). The pressure in the second regulator chamber (270), and thus the pressure in the biasing chamber (251), can as such be increased or decreased by adjusting the handle rod (252) (which in turn adjusts the tension on the spring (250)).

Similar to the second embodiment described above, the third embodiment depicted in FIG. 10, for inflation in use, the required pressure may be adjusted by adjusting the handle and the handle rod (252) of the regulator (249) so the tension in the spring (250) and accordingly the force it exerts on the regulator diaphragm (253) is at a predetermined or selected level. A pressure gauge may be connected to the second regulator chamber (270), allowing the user to observe the set pressure in the biasing chamber (251), via a gauge port (not shown). Alternatively a gauge may be connected to the output chamber (224) so that the pressure in the output port (226), and as such the pressure in the tyre, may be observed.

As described above, a compressor (not shown) may be connected to the first port (222) and may provide air or fluid pressure in the input chamber (220). As result of the air or fluid pressure in the input chamber (220) and the bias in the spring (230), a seal (232) of the plunger (228) abuts with a contact surface (234) and inhibits air or fluid flow between the input chamber (220) and the output chamber (224).

In this embodiment (200), a plurality of forces are hence acting on the deflation diaphragm (248A), including:

(a) a force as result of pressure in the biasing chamber (251) (which depends on: the pre-determined adjustment of the spring (250) and the pressure exerted by the regulator diaphragm (253) onto the second regulator chamber (270), the pilot passage (272) and the biasing chamber (251));

(b) a force as result of pressure in the output chamber (224);

(c) a force as a result of the pressure by the diaphragm biasing spring (297); and (d) a force as result of the bias (230) (and the force on the plunger (228) caused by pressure in the input chamber (220)) of the plunger (228) when it abuts with the deflation diaphragm (248A).

The adjustable biasing force from the spring (250) engages the regulator diaphragm (253) and causes it to push down on the pin (290) and plunger (255) and thus opening the airflow from the first regulator chamber (263) to the second regulator chamber (270) and thereby pressurizing the second pilot passage (272). As mentioned, when this biasing force is reduced, air or fluid may be enabled to escape through the opening (292) in the regulator diaphragm (253), reducing pressure in the second regulator chamber (270). On the other hand, when the biasing force is increased, the regulator diaphragm (253) moves the pin (290) and the regulator plunger (255) to allow air or fluid from the first regulator chamber (263) to be conveyed through the second regulator chamber (270) and the pilot passage (272) to the biasing chamber (251) (with the opening (292) held closed by the pin (290)). The handle may comprise a screw (not shown) for moving the handle rod (252) to press against the bias of the spring (250) and to increase (or decrease) the pressure in the second pilot chamber (270).

It is now assumed that a tire or other pneumatic container is connected to the second port (226). If the tire is relatively deflated, the pressure in the output chamber (224) will be less than the pressure in the input chamber (220) which is connected to the compressor or pump. It will be appreciated that friction and other losses are also at play, but movement of the deflation diaphragm (248A) may be initiated if one or more of the forces mentioned above are adjusted or changed. When the pressure in the biasing chamber (251) is large enough (due to the adjustment of the regulator (249) and due to the air or fluid supply to it through the small passage (259) and the first regulator chamber (263)), the deflation diaphragm (248A) moves away from the biasing chamber (251) and engages with the plunger (228) (while also closing the vent (242) thereof), pushing the plunger (228) to its open condition, and enabling air or fluid to flow from the input chamber (220) to the output chamber (224) for inflation through the second port (226). Once the pressure in the output chamber (224) becomes closer to or equal to the pressure on the deflation diaphragm (248A) from the pressure in the biasing chamber (251) and the biasing spring (297), the plunger (228) moves towards the biasing chamber (251), towards its closed position and the air or fluid flow from the input chamber (220) to the output chamber (224) may slow and eventually stop when the plunger again moves to its closed condition with its seal (232) pressing against the contact surface (234). Stated differently, when the pressure in the output chamber (224) is less than the pressure in the biasing chamber (251) combined with the pressure from the biasing spring (297), the deflation diaphragm (248A) may move away from the biasing chamber (251), and if the pressure from the biasing chamber (251) and the biasing spring (297) is also large enough to overcome the forces acting on the plunger (228) (inter alia the force from the spring (230) and the pressure in the input chamber (220)), the deflation diaphragm (248A) may move the plunger (228) to its open position, allowing air to inflate to the tire through the second port (226).

If a user now desires to inflate the tire, the regulator (249) may be adjusted as mentioned above, 1o by adjusting the spring (250) and hence increasing the pressure in the second regulator chamber (270). This is referred to as the set pressure for inflation and can be observed by connecting a gauge (not shown) to a gauge port (not shown) that is in fluid communication with the second regulator chamber (270). The pressure on the deflation diaphragm (248A) from the biasing chamber (251) side will engage the deflation diaphragm (248A) with the plunger (228), closing the vent (242) and pushing the plunger (228) towards the input chamber (220), breaking the connection between the plunger seal (260) and the coordinating surface (234). Air or fluid will then flow as described above, from the compressor, through the input port (222) the input chamber (220), through the opening between the connecting surface (234) and the plunger seal (260), to the output chamber (224), through the output port (226) and into the tire(s). When the required set pressure in the tire is reached, and hence the pressure in the output chamber (224), the resulting pressure on the deflation diaphragm (248A) from the output chamber (224) side is equal to the pressure on the deflation diaphragm (248A) from the biasing chamber (251) side, and the plunger (228) is thus pushed upwards (due to the reduction in the resulting force from the deflation diaphragm (248A) on the plunger (228)) by the spring (230) and the pressure in the input chamber (220), thus closing the opening between the plunger seal (232) and the coordinating surface (234). The inflation process thus comes to a halt at the set pressure.

When a tire (or other pressurized container, or a plurality of tires) is on the other hand relatively inflated it may be connected to the second port (226) for deflation, without requiring a compressor or pump to be connected to the first port (220). It is now assumed that the input chamber (220) is not connected to a compressed air supply. When a relatively inflated tire is now connected to the second port (226), the pressure from the tire itself enters the output chamber (224). The plunger (228) is in its closed condition due to the bias of the spring (230). The air or fluid from the output chamber (224) and from the tire may now flow to the first regulator chamber (263) through the adjustable passage (293), the small passage (259), and the passage (261). Hence, using air or fluid from the container or tire itself through the second port (226), air or fluid may be supplied to the small passage (259), to the first and second regulator chambers (263, 270), to the pilot passage (272) and to the biasing chamber (251).

If a user now desires to deflate the tire, the regulator (249) may be adjusted as mentioned above, by adjusting the spring (250) and hence decreasing the pressure in the second regulator chamber (270). This is referred to as the set pressure which can be observed through the gauge on the gauge port (not shown). Air or fluid will then flow as described above, from the tire to the biasing chamber (251) by way of flowing through the output port (226), through small passage (259), through the first and second pilot chambers (263, 270) and eventually through the pilot passage (272).

When the user now turns the handle to reduce pressure, the pressure in the biasing chamber (251) is reduced, which causes a balance of forces acting on the deflation diaphragm (248A) to 15 be changed so that the deflation diaphragm (248A) moves away from the opening (243) of the vent (242) in the plunger (228), thereby allowing air or fluid to deflate from the output chamber (224) (and from the tire) out of the vent (242). The user may accordingly adjust the controller(249) to adjust the pressure in the biasing chamber (251), to deflate the tire through the vent (242), until the required pressure in the tire is reached, whereupon the deflation diaphragm (248A) may again move to allow the seal (260) of the plunger (228) to close the vent (242) thereof, ending the deflation process. In this embodiment, the deflation is hence controlled through the pilot passage (272) and by a difference in pressure between the pressure on the deflation diaphragm (248A) from the side of the biasing chamber (251) and the pressure in the output chamber (224).

The controller (200) is accordingly configured to enable deflation of the tire or pneumatic container through the vent (242) when the compressor or pump is disconnected from the first port (222) by utilizing pressure from the container or tire itself. The adjustable passage (295) and the small passage (259), as well as other holes and blind holes may be closed with suitable plugs if required.

Another example of a two-part embodiment of a mechanical controller according to the invention is generally designated by the reference numeral (300) in FIGS. 11 to 14.

Figure 11:
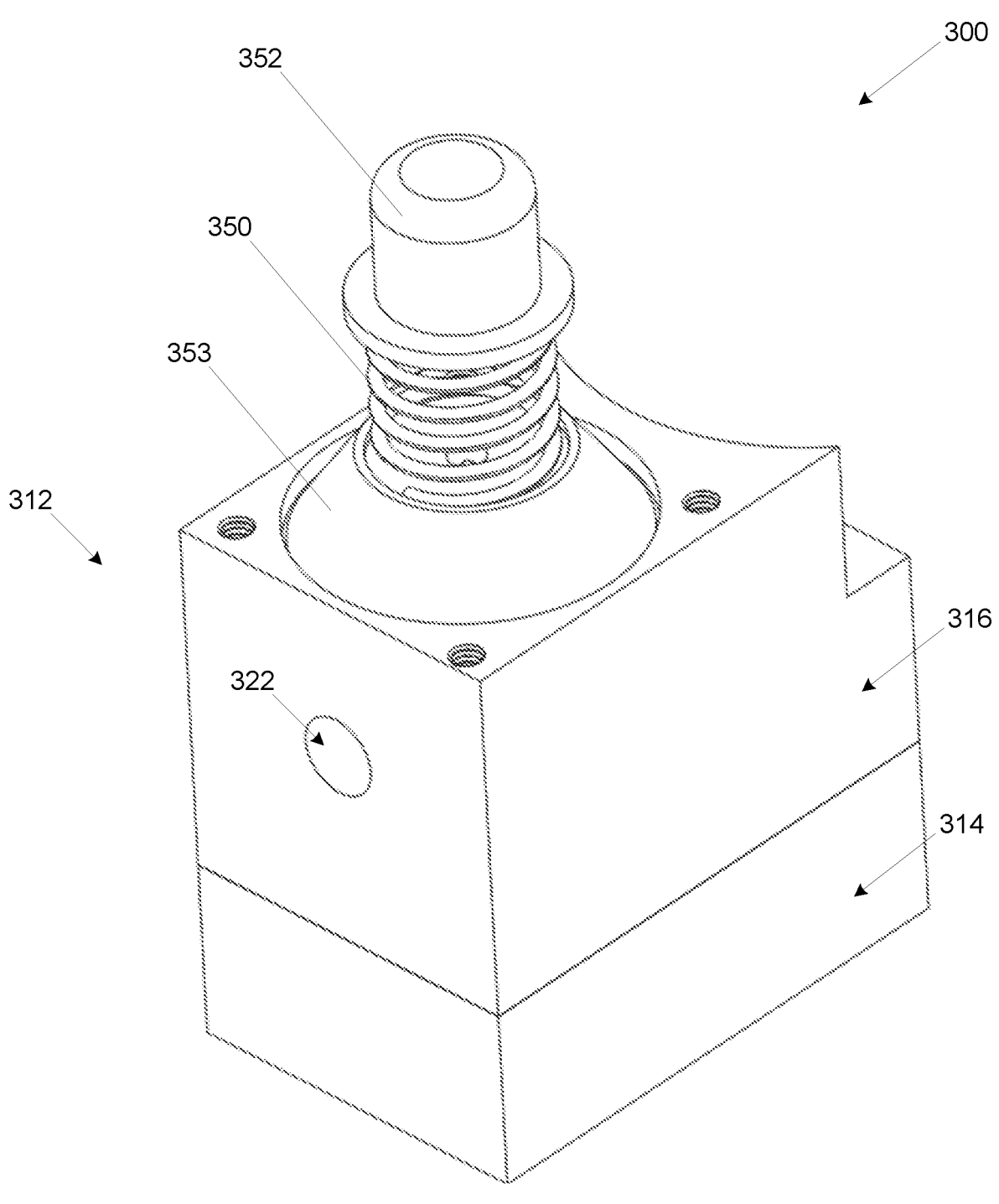
FIG. 11 is a three-dimensional view of a fourth exemplary embodiment of a pneumatic pressure controller showing a first port thereof.
Figure 12:
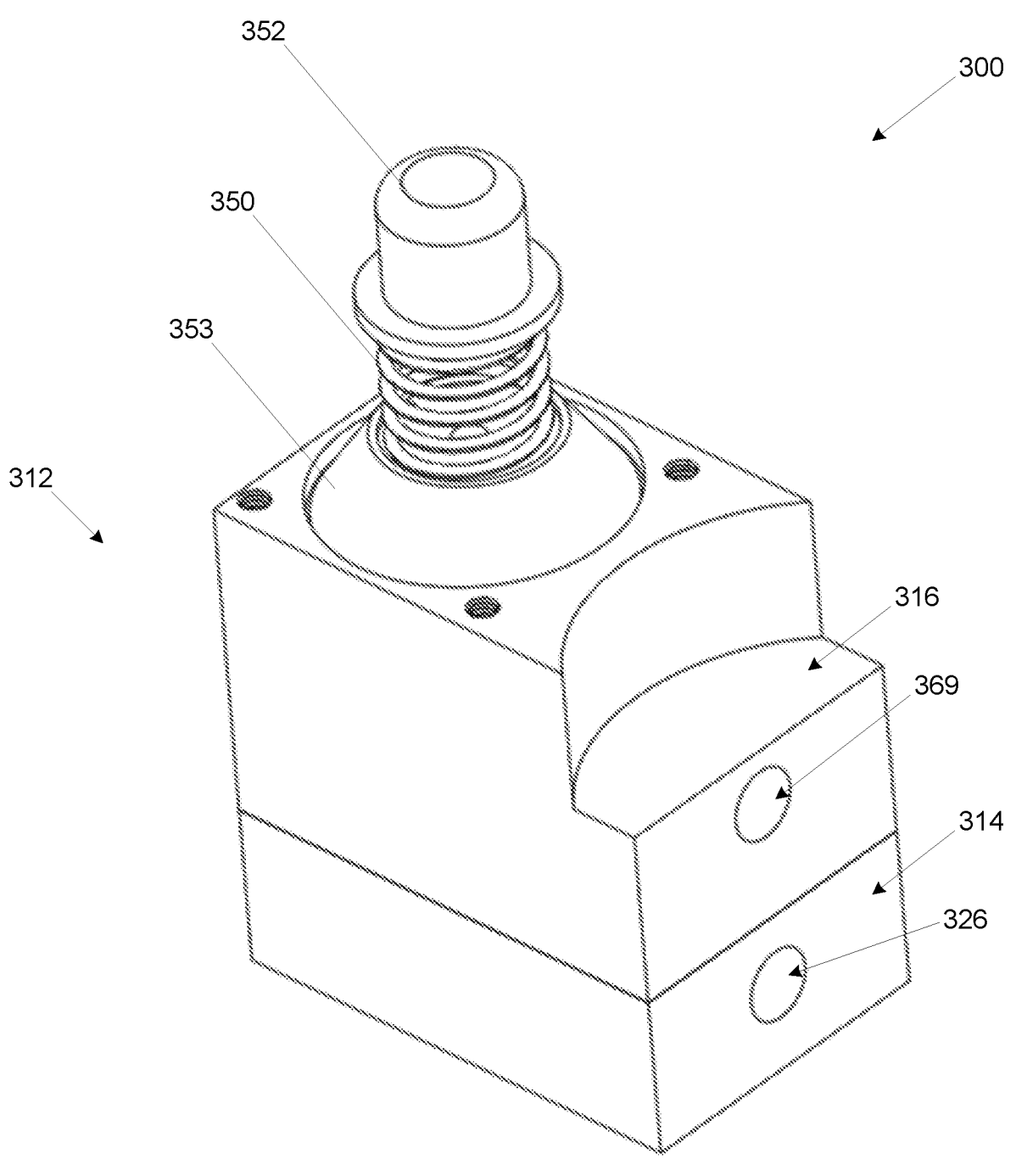
FIG. 12 is a another three-dimensional view of the controller of FIG. 11 showing a second port and a gauge port thereof.
Figure 13:
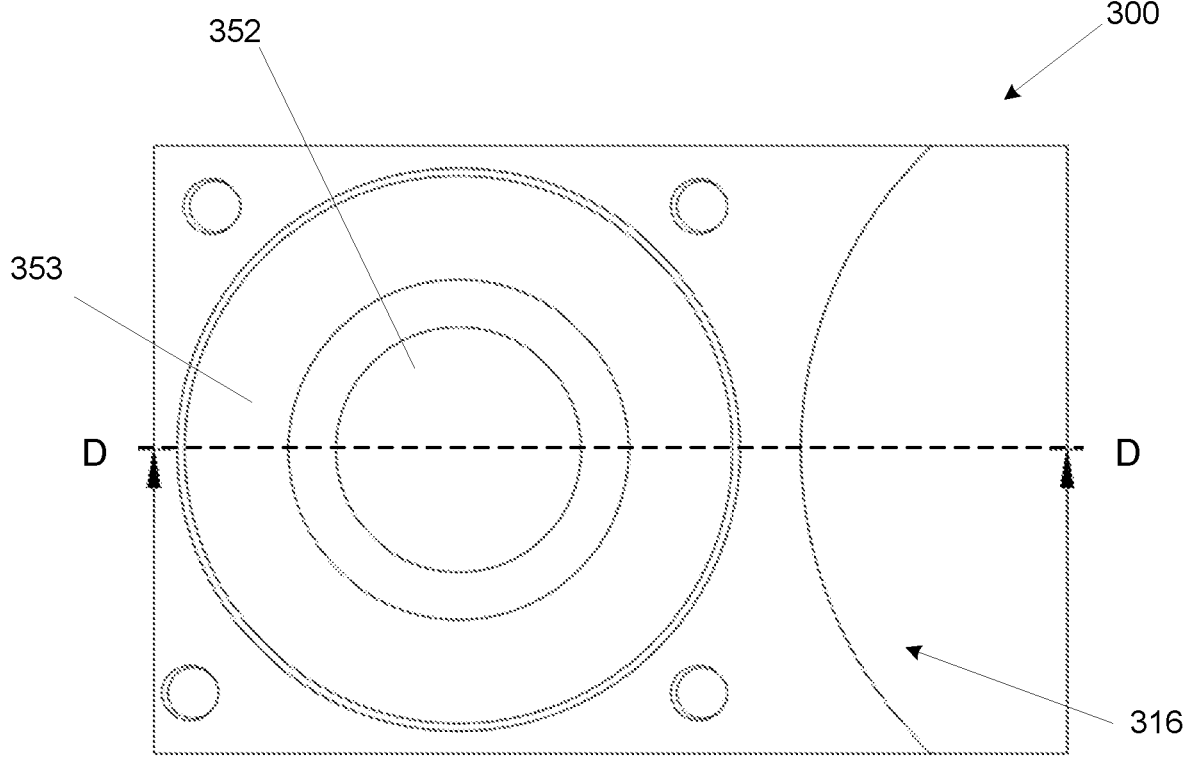
FIG. 13 is a top view of the controller of FIG. 11.

In the exemplary embodiment, parts (314, 316) of the controller (300) are secured to one another to form a body (312) of the controller (300) (see FIGS. 11 and 12). This two-part embodiment of the controller (300) is merely an example and other arrangements are possible that do not utilize two parts, but that utilize a single part, or more than two parts. The body may for example be formed by casting of a single part.

The body (312) extends along a major axis (364) (see FIG. 14) and includes a first part (314) and a second part (316). The first and second parts (314,316) are mounted to one another, for example using suitable fasteners (not shown in the drawings).

Figure 14:
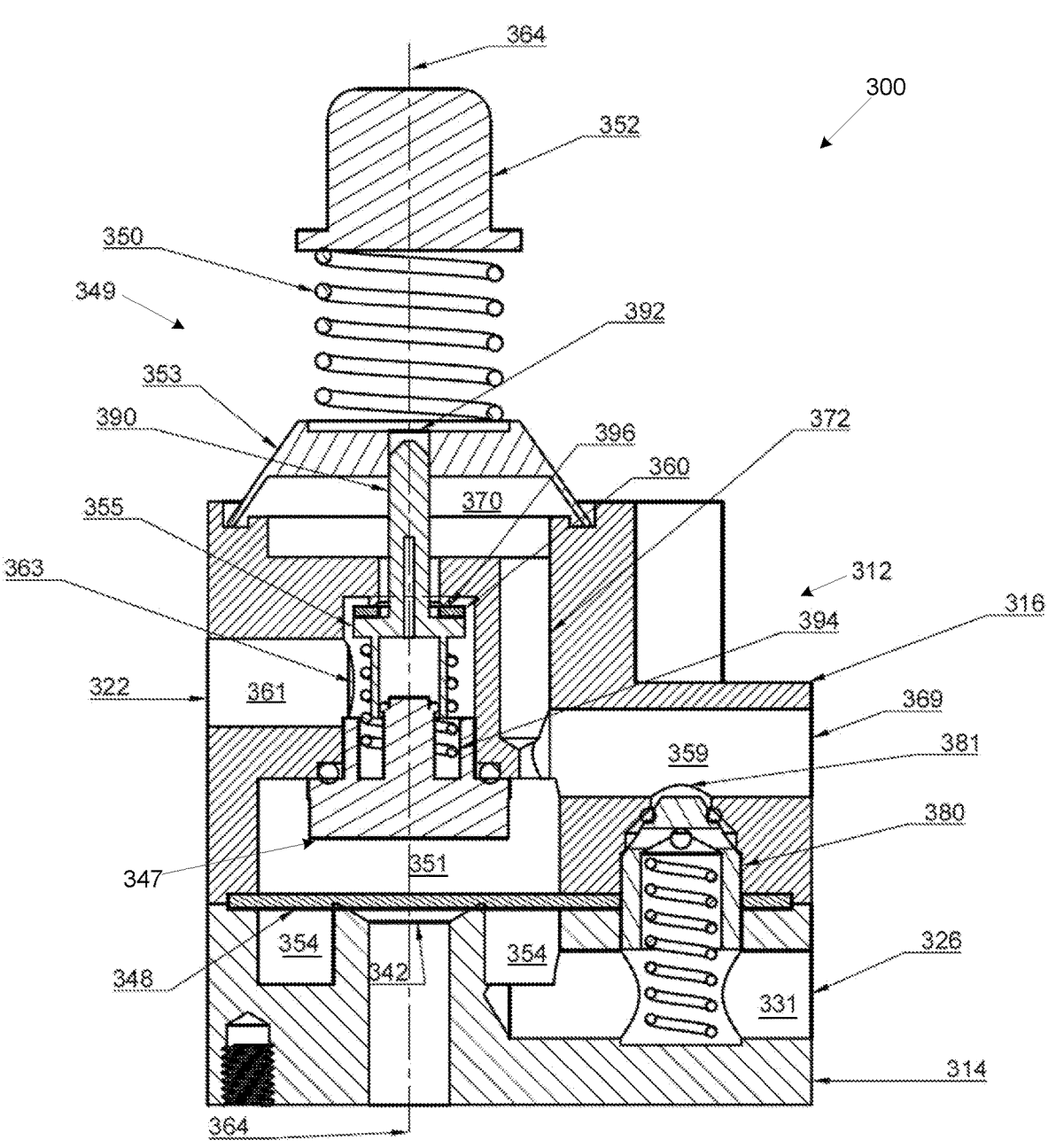
FIG. 14 is a sectional view taken along line D-D in FIG. 13 and shows internal components of the controller of FIG. 11.

As is best shown in the sectional view in FIG. 14, an input chamber (361) is formed in the second part (316) of the body (312). The input chamber (361) of this embodiment is in fluid flow communication with a first port (322) or input port of the controller (300), and an output chamber (331) is provided in fluid flow communication with a second port (326) or output port.

The controller (300) has a vent (342) therein for deflation from the output chamber (331) to the atmosphere and a deflation diaphragm (348) which, when in a closed condition, closes an opening of the vent (342). A variable bias is applied to the deflation diaphragm (348) by means of an adjustable inflation regulator (349) which includes an adjustable spring (350), an inflation diaphragm (353) (also known as a regulator diaphragm (353)) and an inflation plunger (355). A bottom plug (347) of the inflation regulator (349) is located in a diaphragm biasing chamber (351).

A first inflation chamber (363) is located adjacent to the input chamber (361) and a second inflation chamber (370) is defined adjacent to the diaphragm (353). A passage (372) is provided in the second part (316) of the body (312) between the second inflation chamber (370) and the diaphragm biasing chamber (351).

A hole (359) is provided in the second part (316) of the body (312) to form a passage between the passage (372), which is in fluid communication with the second inflation chamber (370), and a check valve passage (381). A check (i.e. one-way/non-return) valve (380) is installed in the check valve passage (381), providing one-way flow of air or fluid from the passage (359) to the output chamber (331), and thus preventing flow from the output chamber (331) to the passage (359).

Referring again to the inflation regulator (349), the inflation plunger (355) is biased, in this example with a spring (394), towards a closed condition wherein it inhibits air or fluid flow from the first inflation chamber (363) to the second inflation chamber (370). This is facilitated by way of a seal (360) which abuts a cooperating contact surface (396) provided in the second part (316) of the body (312) to prevent flow to the second inflation chamber (370).

When the user adjusts the adjustable spring (350), e.g. with a handle rod (352) located at the top of the controller (300), and increases the variable bias, the diaphragm (353) abuts and engages with a pin (390) pushing it and moving it towards the first inflation chamber (363), thereby causing the inflation plunger (355) to move to its open condition and to allow air or fluid to flow between the first and second inflation chambers (363, 370). Hence, if the pressure in the first inflation chamber (363) is higher than the pressure in the diaphragm biasing chamber (351) and the inflation plunger (355) is moved to its open condition through the pin (390), air or fluid will flow from first inflation chamber (363), past the inflation plunger (355), into the second inflation chamber (370) and through the pilot passage (372) to the diaphragm biasing chamber (351).

When the pressure on the diaphragm (353) exerted by the bias is reduced sufficiently by turning the handle (350), the plunger (355) moves into its closed position, and air flow from the inflation input chamber (363) to the inflation output chamber (370) stops. The pin (390) is arranged to mate with an accommodating opening (392) of the diaphragm (353), and to close the opening (392) therein when the pin (390) abuts with the diaphragm (353). Decreasing the pressure of the second inflation chamber (370) may hence be performed by adjusting a handle rod (352) (or by adjusting a handle (not shown) that engages with the handle rod) and allowing air or fluid to escape from the opening (392). The opening (392) in the inflation diaphragm (353) may thus deflate the pressure in biasing chamber (351) when the pressure (or tension) on the spring (350) is reduced. The air in the output chamber (331) will not escape through the opening (392)

due to the uni-directional valve (380) that inhibits air flow from the output chamber (331) to the passage (359) that is in fluid communication with the second inflation chamber (370) and the opening (392).

Still referring to FIG. 14, for inflation in use, the required pressure may be adjusted by adjusting the handle rod (352) of the inflation regulator (349) so that the tension in the spring (350) and accordingly the force it exerts onto diaphragm (353) is at a predetermined or selected level. A pressure gauge may also be connected to a gauge port (369) which is an opening of the hole (359), allowing the user to observe the set pressure (i.e. the pressure in the diaphragm biasing chamber (351) and/or the pressure in the second inflation chamber (370)). This may be referred to as a pilot pressure which regulates or controls the movement of the diaphragm (348). Alternatively other arrangements are possible wherein the gauge is connected to the output chamber (331), wherein instead of being connected to the second inflation chamber (370) and the biasing chamber (351), the gauge may be connected to the output chamber (331) and/or output port (326) so that the set output pressure or the pressure in a tire coupled to the output port (326) may be observed.

A compressor (not shown) may be connected to the first port (322) and may provide air or fluid pressure in the input chamber (363). As result of the air or fluid pressure in the input chamber (363) and the bias in the spring (394), the seal (360) of the plunger (355) abuts with the surface (396) and inhibits air or fluid flow between the input chamber (363) and the second inflation chamber (370).

In this embodiment (300), the following forces may thus act on the diaphragm (348) in use:

(a) a force as result of pressure in the diaphragm biasing chamber (351) (which depends on: the pre-determined adjustment of the spring (350), the pressure in the first inflation chamber (363) and the pressure exerted by the diaphragm (353) onto the second inflation chamber (370), the pilot passage (372) and the biasing chamber (351)); and (b) a force as result of pressure in the output chamber (331).

It is now assumed that a tire or other pneumatic container is connected to the second port (326) and a compressor to the input port (322). If the tire is relatively deflated, the pressure in the output chamber (331) will be less than the pressure in the input chamber (363) which is connected to the compressor or pump. It will be appreciated that friction and other losses are also at play, but when the pressure in the diaphragm biasing chamber (351) is large enough (due to the adjustment of the inflation regulator (349) and due to the air or fluid supply to it through the first inflation chamber (363), and in turn by the compressor connected to port (322)), the diaphragm (348) moves in a direction away from the biasing chamber (351) and engages with and closes the vent (342). When the pressure in the second inflation chamber (370) is larger than the pressure in the output chamber (331) air will flow from the second inflation chamber (370), via the check valve (380) to the output passage (331) for inflation through the second port (326). Once the pressure in the output passage (331) becomes closer to or equal to the pressure in the second inflation chamber (370), the air or fluid flow from the input chamber (361, 363) to the output passage (331) will slow and eventually stop.

If a user now desires to deflate a tire, the inflation regulator (349) may be adjusted as mentioned above, by adjusting the spring (350) and hence decreasing the pressure in the second inflation chamber (370). This is referred to as the inflation set pressure which can be observed through the gauge on the gauge port (369). This will decrease the pressure in the biasing chamber (351) and when the pressure in the diaphragm biasing chamber (351) is lower than the pressure in the output chamber (331), the diaphragm (348) will then move away from the vent (342). Air or fluid will then flow from the tire to the output chamber (331), by way of flowing through the output port (326), through the output chamber (331) and then through an output passage (354), escaping through the vent (342). Once the pressure in the output chamber and passage (331, 354) becomes closer to or equal to the pressure in the inflation biasing chamber (351), the air or fluid flow from the output chamber (354) and passage (331) through the vent (342) may slow and eventually stop. The deflation process thus comes to a halt at the set pressure. The passage (359) as well as other holes and blind holes may be closed with suitable plugs if required.

Embodiments of the present invention may address some of the issues identified in the "Background" section above, at least to some extent. In particular, the controller may allow for fairly rapid inflation and/or deflation without complex components and, in at least some embodiments, in a mechanical fashion without requiring electronic components.

It will be appreciated by those skilled in the art that there are many variations to the invention as herein defined and/or described with reference to the accompanying drawings, without departing from the spirit and scope of this disclosure. For example, the body may be manufactured by casting, molding, additive manufacturing, subtractive manufacturing or any other suitable manufacturing technique. The configuration or arrangement of passages, ports and chambers of the controller are not limited to those shown in the drawings and many other arrangements are possible. The gauge port may also be used for inflation or deflation and one or more additional ports and/or one or more of the plugged ports may be used for additional vessels/tires. Alternatively, a plurality of tires may be connected to one port using further pneumatic connecting joints such as T-joints etc. The controller may be mounted to a vehicle to facilitate use in the field.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Throughout the specification unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A pneumatic pressure controller comprising: a body defining an input chamber in fluid flow communication with a first port, and an output chamber in fluid flow communication with a second port, wherein the first port is connectable to a pneumatic pressure source and the second port is connectable to a pneumatic container, the body further defining an inflation chamber; an inflation plunger biased towards a closed condition wherein the inflation plunger inhibits fluid flow from the input chamber to the inflation chamber and to the output chamber, and is moveable against the inflation plunger bias to an open condition wherein the inflation plunger allows fluid flow from the input chamber to the inflation chamber and to the output chamber, thereby permitting controlled inflation, through the second port, of the pneumatic container connected to the pneumatic pressure controller, while permitting controlled inflation, movement of the inflation plunger is controlled by movement of a regulator diaphragm connected to the inflation plunger, the regulator diaphragm is located adjacent to the inflation chamber and in turn is controlled by a combination of pressure from an adjustable biasing member and pressure in the inflation chamber, wherein the inflation plunger moves from the open condition back to the closed condition, in while inhibiting controlled inflation, once the combined pressure from the biasing member and the inflation chamber is equal to or less than the bias on the inflation plunger; a vent operatively permitting deflation of the pneumatic container, the vent having a diameter substantially equal to or greater than a diameter of the second port; and a deflation diaphragm or a deflation piston variably biased towards a closed condition wherein the deflation diaphragm or the deflation piston closes the vent, the deflation diaphragm or deflation piston configured to move away from the vent to an open condition under the influence of fluid pressure in the output chamber when the inflation plunger is in the closed condition and the variable bias on the deflation diaphragm or piston is less than the fluid pressure in the output chamber, enabling fluid to travel from the second port through the output chamber and through the vent into an external atmosphere, wherein the deflation diaphragm or deflation piston moves from the open condition back to the closed condition once fluid pressure in the output chamber is reduced to less than the variable bias on the deflation diaphragm or piston.

2. The pneumatic pressure controller according to claim 1, that includes the deflation diaphragm, and further including a diaphragm biasing chamber adjacent to the deflation diaphragm, where the deflation diagram is configured to be pressurized and de-pressurized to adjust the variable bias on the deflation diaphragm.

3. The pneumatic pressure controller according to claim 2, wherein the regulator diaphragm is variably biased to adjust the bias on the inflation plunger, wherein the adjustable biasing member is an adjustable spring, and wherein the inflation plunger, the regulator diaphragm and the adjustable spring form part of an inflation regulator.

4. The pneumatic pressure controller according to claim 3, wherein the variable bias on the deflation diaphragm is provided by pneumatic pressure applied to the deflation diaphragm by the inflation regulator utilizing pressure from the first port.

5. The pneumatic pressure controller according to claim 4, wherein, for inflation, a required or set pressure is adjusted by adjusting the inflation regulator so that tension in the spring and force exerted onto the regulator diaphragm is at a predetermined or selected level and flow of fluid from the input chamber to the output chamber is stopped or prevented once the required or set pressure is reached in the output chamber.

6. The pneumatic pressure controller according to claim 1, wherein the body defines a major axis, wherein the inflation plunger, regulator diaphragm and deflation diaphragm or piston are moveable along the major axis, and wherein the vent extends along the major axis.

7. The pneumatic pressure controller according to claim 3, wherein the inflation chamber is a second inflation chamber, and wherein the body further defines a first inflation chamber adjacent to the input chamber, the inflation plunger inhibiting fluid flow from the first inflation chamber to the second inflation chamber wherein the inflation plunger is in the closed condition, and thus also from the input chamber to the second inflation chamber and the output chamber, and allowing fluid flow from the first inflation chamber to the second inflation chamber in wherein the inflation plunger is in the open condition.

8. The pneumatic pressure controller according to claim 7, wherein the inflation regulator is configured to regulate pressure in the diaphragm biasing chamber by adjustment of the variable bias on the regulator diaphragm, such that an increase in the variable bias on the regulator diaphragm causes the inflation plunger to move to the open condition enabling fluid from the input chamber to enter the second inflation chamber through the first inflation chamber and to enter the diaphragm biasing chamber, thereby applying a force on the deflation diaphragm as result of the adjustment of the variable bias on the regulator diaphragm and as result of pressure in the diaphragm biasing chamber.

9. The pneumatic pressure controller according to claim 8, wherein a first supply passage is provided between the inflation regulator and the diaphragm biasing chamber, wherein a second supply passage is provided between the output chamber and the inflation regulator, and wherein a one-way valve is provided to enable one-way fluid flow from the second inflation chamber to the output chamber through the second supply passage.

10. The pneumatic pressure controller according to claim 7, wherein a gauge port is provided for connecting a pressure gauge to the second inflation chamber.

11. The pneumatic pressure controller according to claim 1, wherein a gauge port is provided for connecting a pressure gauge to the output chamber.

12. The pneumatic pressure controller according to claim 1, wherein the pneumatic pressure source is a pump or a compressor.

13. The pneumatic pressure controller according to claim 1, wherein the pneumatic container is a tire.

14. A tire inflation and deflation kit including a pneumatic pressure controller according to claim 13.

15. A method of controlling pneumatic pressure, the method comprising: providing a body defining an input chamber in fluid flow communication with a first port, and an output chamber in fluid flow communication with a second port, the body further defining an inflation chamber; biasing an inflation plunger towards a closed condition wherein the inflation plunger inhibits fluid flow from the input chamber to the inflation chamber and the output chamber; connecting a pneumatic pressure source to the first port; connecting a pneumatic container to the second port; applying a counter-bias to move the inflation plunger against the inflation plunger bias to an open condition, wherein in the open condition the inflation plunger allows fluid flow from the input chamber to the inflation chamber and the output chamber, thereby permitting controlled inflation, through the second port, of the pneumatic container, movement of the inflation plunger is controlled by movement of a regulator diaphragm connected to the inflation plunger, the regulator diaphragm is located adjacent to the inflation chamber and in turn is controlled by a combination of pressure from an adjustable biasing member and pressure in the inflation chamber, wherein the inflation plunger moves from the open condition back to the closed condition once the combined pressure from the biasing member and the inflation chamber is equal to or less than the bias on the inflation plunger; and causing a variably biased deflation diaphragm or deflation piston located in the body to move away from a closed condition in wherein the deflation diaphragm or the deflation piston closes a vent of the body to an open condition under the influence of fluid pressure in the output chamber when the inflation plunger is in the closed condition and the variable bias on the deflation diaphragm or piston is less than the fluid pressure in the output chamber, thereby enabling deflation of the pneumatic container through fluid travelling from the second port through the output chamber and through the vent into an external atmosphere, the vent having a diameter substantially equal to or greater than a diameter of the second port, and wherein the deflation diaphragm moves from the open condition back to the closed condition once pressure in the output chamber is reduced such that this pressure is less than the variable bias on the deflation diaphragm or piston.

16. The method according to claim 15, including varying an amount of fluid travelling through the vent by adjusting the variable bias on the deflation diaphragm or piston.

* * * * *